(12) United States Patent
Mao

(10) Patent No.: US 11,440,103 B2
(45) Date of Patent: Sep. 13, 2022

(54) CUTTING INSERT, CUTTING TOOL, AND METHOD FOR MANUFACTURING MACHINED PRODUCT

(71) Applicant: KYOCERA Corporation, Kyoto (JP)

(72) Inventor: Shohei Mao, Yasu (JP)

(73) Assignee: KYOCERA CORPORATION, Kyoyo (JP)

( * ) Notice: Subject to any disclaimer, the term of this patent is extended or adjusted under 35 U.S.C. 154(b) by 123 days.

(21) Appl. No.: 17/053,378

(22) PCT Filed: May 7, 2019

(86) PCT No.: PCT/JP2019/018286
§ 371 (c)(1),
(2) Date: Nov. 6, 2020

(87) PCT Pub. No.: WO2019/216319
PCT Pub. Date: Nov. 14, 2019

(65) Prior Publication Data
US 2021/0069796 A1    Mar. 11, 2021

(30) Foreign Application Priority Data
May 7, 2018   (JP) .............................. JP2018-089278

(51) Int. Cl.
*B23C 5/20* (2006.01)
*B23B 27/14* (2006.01)
*B23C 5/10* (2006.01)

(52) U.S. Cl.
CPC .............. *B23B 27/141* (2013.01); *B23C 5/10* (2013.01); *B23C 5/202* (2013.01); *B23C 2200/208* (2013.01); *B23C 2200/367* (2013.01)

(58) Field of Classification Search
CPC .......... B23B 27/141; B23C 2200/0477; B23C 2200/208; B23C 2200/367;
(Continued)

(56) References Cited

U.S. PATENT DOCUMENTS

| | | | |
|---|---|---|---|
| 6,238,146 B1* | 5/2001 | Satran | B23C 5/2213 407/115 |
| 2005/0169716 A1* | 8/2005 | Smilovici | B23C 5/2213 407/113 |

(Continued)

FOREIGN PATENT DOCUMENTS

JP    2007-098506 A    4/2007

*Primary Examiner* — Nicole N Ramos
(74) *Attorney, Agent, or Firm* — Volpe Koenig

(57) ABSTRACT

A cutting insert may include a first surface, a second surface, a first lateral surface, a second lateral surface, a first cutting edge and a second cutting edge. The first lateral surface may include a first inclined surface located along the first cutting edge, a second inclined surface located along the first inclined surface, a third inclined surface located along the second cutting edge, a fourth inclined surface located along the third inclined surface, and a flat surface located along the second inclined surface and the fourth inclined surface. A second inclination angle of the second inclined surface may be smaller than a first inclination angle of the first inclined surface. A fourth inclination angle of the fourth inclined surface may be larger than a third inclination angle of the third inclined surface.

17 Claims, 24 Drawing Sheets

(58) Field of Classification Search
CPC ........ B23C 2200/287; B23C 2200/289; B23C 2200/291; B23C 2200/24; B23C 5/10; B23C 5/109; B23C 5/202; B23C 5/06; B23C 5/165; B23C 5/205
See application file for complete search history.

(56) References Cited

U.S. PATENT DOCUMENTS

| | | | |
|---|---|---|---|
| 2006/0045636 A1* | 3/2006 | Johnson | B23C 5/2213 407/42 |
| 2009/0136304 A1* | 5/2009 | Satran | B23C 5/202 407/104 |
| 2012/0195700 A1* | 8/2012 | Chen | B23C 5/2213 407/42 |
| 2013/0108387 A1* | 5/2013 | Ishi | B23C 5/202 407/66 |
| 2014/0298967 A1* | 10/2014 | Ishi | B23C 5/109 83/13 |
| 2014/0348599 A1* | 11/2014 | Kovac | B23C 5/202 407/42 |
| 2017/0144235 A1* | 5/2017 | Dagan | B23C 5/02 |

* cited by examiner ately inclined so as to become closer to the reference plane as going away from the second ridgeline.

A second inclination angle of the second inclined surface relative to the reference plane may be smaller than a first inclination angle of the first inclined surface relative to the reference plane in a cross section orthogonal to the first ridgeline in a front view of the first lateral surface. A fourth inclination angle of the fourth inclined surface relative to the reference plane may be larger than a third inclination angle of the third inclined surface relative to the reference plane in a cross section orthogonal to the second ridgeline in the front view of the first lateral surface.

CUTTING INSERT, CUTTING TOOL, AND METHOD FOR MANUFACTURING MACHINED PRODUCT

CROSS-REFERENCE TO RELATED APPLICATION

This application is a national stage entry according to 35 U.S.C. 371 of PCT Application No. PCT/JP2019/018286, filed on May 7, 2019, which claims priority to Japanese Application No. 2018-089278, filed on May 7, 2018, which are entirely incorporated herein by reference.

TECHNICAL FIELD

The present disclose generally relates to cutting inserts for use in a cutting process. Specifically, the present disclose relates to cutting inserts for use in a milling process.

BACKGROUND

An indexable cutting insert is discussed in Japanese Unexamined Patent Application Publication No. 2007-98506 (Patent Document 1) as a cutting insert for use in a cutting process of a workpiece, such as metal. The cutting insert discussed in Patent Document 1 may have a quadrangular plate shape. A main cutting edge may be located on a ridgeline where an upper surface intersects with a lateral surface, and a sub cutting edge may be located on a ridgeline where lateral surfaces are adjacent to each other. The lateral surfaces may correspond to rake surfaces.

SUMMARY

A cutting insert in non-limiting aspects of the present disclosure may include a first surface, a second surface, a lateral surface, a first cutting edge and a second cutting edge. The first surface may have a polygonal shape and may include a first corner, and a first side and a second side individually extended from the first corner. The second surface may have a polygonal shape and may be located on a side opposite to the first surface. The lateral surface may be located between the first surface and the second surface, and may include a first lateral surface and a second lateral surface. The first lateral surface may be located along the first side. The second lateral surface may be located along the second side. The first cutting edge may be located on at least a part of a first ridgeline where the first surface intersects with the first lateral surface. The second cutting edge may be located on at least a part of a second ridgeline where the first lateral surface intersects with the second lateral surface.

The first lateral surface may include a first inclined surface, a second inclined surface, a third inclined surface, a fourth inclined surface and a flat surface. The first inclined surface may be located along the first ridgeline. The second inclined surface may be located along the first inclined surface. The third inclined surface may be located along the second ridgeline. The fourth inclined surface may be located along the third inclined surface. The flat surface may be located along the second inclined surface and the fourth inclined surface. An imaginary flat surface that is parallel to the flat surface and located more inside than the first lateral surface may be a reference plane. The first inclined surface and the second inclined surface may be individually inclined so as to become closer to the reference plane as going away from the first ridgeline. The third inclined surface and the

EMBODIMENTS

Figure 1:
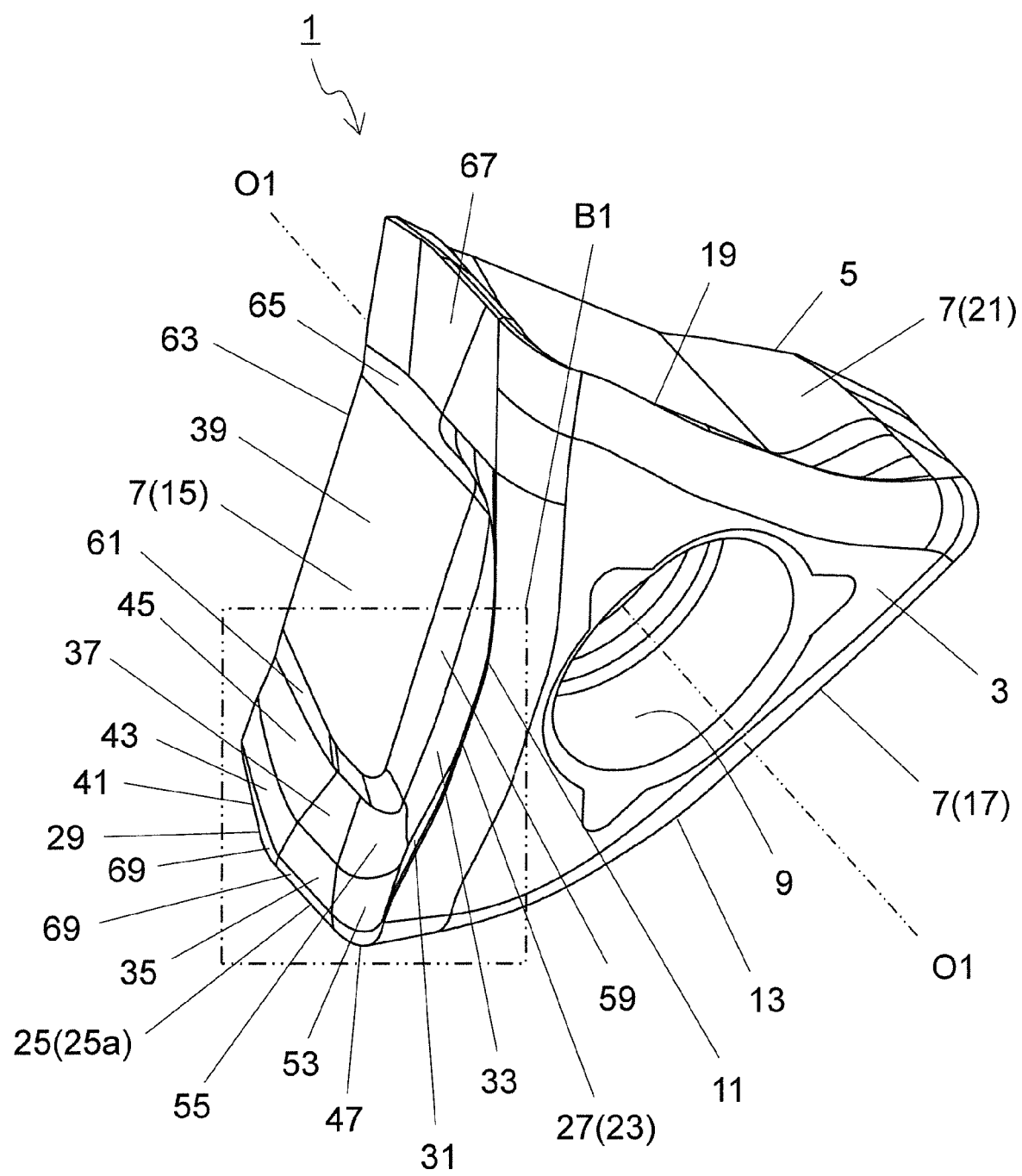
FIG. 1 is a perspective view illustrating a cutting insert in non-limiting aspects of the present disclosure.

In cases where lateral surfaces correspond to rake surfaces in a cutting insert having a quadrangular plate shape, efficient chip disposal may be necessary because of narrow regions of the rake surfaces. The chip disposal may become unstable because the cutting insert described in Patent Document 1 includes only a main cutting edge rake surface and a sub cutting edge rake surface each having a planar shape.

The cutting inserts 1 in non-limiting embodiments may be described in detail below with reference to the drawings. For the sake of description, the drawings referred to in the following may illustrate, in simplified form, only main members necessary for describing the non-limiting embodiments. The cutting inserts 1 disclosed in the following may therefore be capable of including any arbitrary structural member not illustrated in the drawings referred to. Dimensions of the members in each of the drawings may faithfully represent neither dimensions of actual structural members nor dimensional ratios of these members.

<Inserts>

Figure 2:
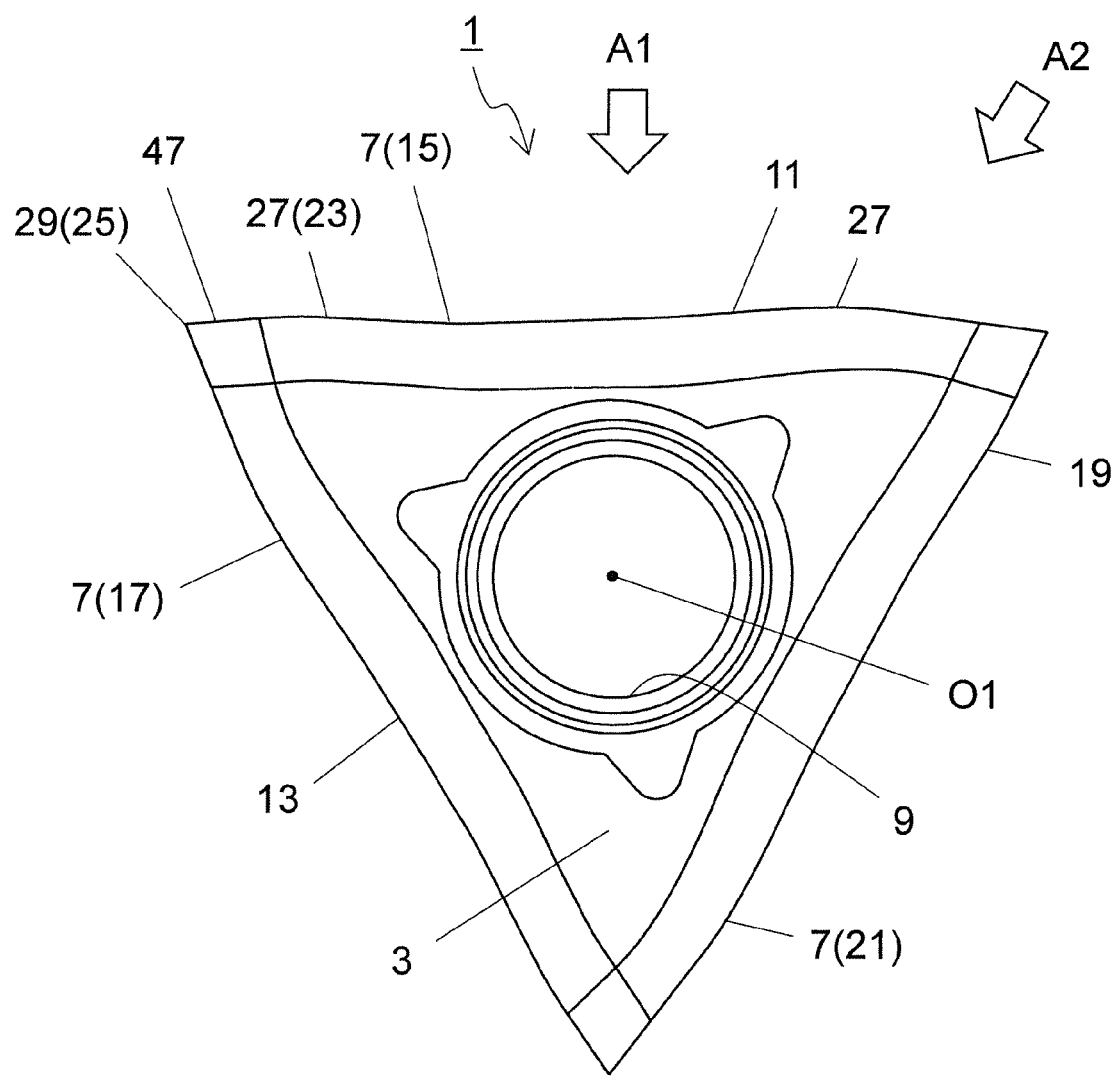
FIG. 2 is a plan view of the cutting insert illustrated in FIG. 1 as viewed from a side of a first surface.

A cutting insert 1 (hereinafter also referred to simply as "the insert 1") in non-limiting aspects of the present disclosure may include, for example, a first surface 3, a second surface 5, a lateral surface 7 and a through hole 9 as illustrated in FIG. 1. The first surface 3 may have a polygonal shape including corners and sides as illustrated in FIG. 2. The second surface 5 may be located on a side opposite to the first surface 3. Similarly to the first surface 3, the second surface 5 may have a polygonal shape including corners and sides. The insert 1 may have a polygonal plate shape as illustrated in FIG. 1.

The first surface 3 may have an approximately triangular shape including three corners and three sides as illustrated in FIG. 2. Similarly to the first surface 3, the second surface 5 may have an approximately triangular shape including three corners and three sides. The three corners and the three sides of the first surface 3 may be located so as to have 120° rotational symmetry around a central axis O1 in a front view of the first surface 3.

In cases where the second surface 5 has a polygonal shape as in the first surface 3, the first surface 3 may not have the same dimension as the first surface 3. The second surface 5 may be slightly smaller than the first surface 3. The term "polygonal shape" may not denote a strict polygonal shape. For example, the three corners of the first surface 3 may have a slightly rounded shape in the front view of the first surface 3, instead of a strict corner.

The three sides may not have a strict straight line shape. As in the non-limiting embodiment illustrated in FIG. 2, the three sides may individually have a part protruded outward and a part protruded inward. The central axis O1 as used above may be replaced with an imaginary straight line that connects a center of the first surface 3 and a center of the second surface 5. The center of the first surface 3 may be determined by, for example, a position of a center of gravity of the first surface 3 in the front view of the first surface 3.

Shapes of the first surface 3 and the second surface 5 are not limited to the above shape. The shape of the first surface 3 may be an approximately triangular shape in the non-limiting embodiment illustrated in FIG. 1. However, the first surface 3 and the second surface 5 may have, for example, a quadrangular shape, pentagonal shape, hexagonal shape or octagonal shape.

Two of the sides of the first surface 3, which are located adjacent to each other and individually extended from a first corner, may be denoted by a first side 11 and a second side 13. In other words, the first surface 3 may have a polygonal shape including the first corner, and the first side 11 and the second side 13 each being extended from the first corner.

The lateral surface 7 may be located between the first surface 3 and the second surface 5. The lateral surface 7 may connect to the first surface 3 and the second surface 5 as in the non-limiting embodiment illustrated in FIG. 1. In cases where the first surface 3 includes the first side 11 and the second side 13, the lateral surface 7 may include a first lateral surface 15 located along the first side 11, and a second lateral surface 17 located along the second side 13. As described above, the first lateral surface 15 and the second lateral surface 17 may be adjacent to each other if the first side 11 is adjacent to the second side 13 as described above.

In cases where the first surface 3 has the approximately triangular shape as in the non-limiting embodiment illustrated in FIG. 2, the first surface 3 may include a third side 19 in addition to the first side 11 and the second side 13. The lateral surface 7 may include a third lateral surface 21 located along the third side 19, in addition to the first lateral surface 15 and the second lateral surface 17.

The three angles and the three sides of the first surface 3 may be located so as to have 120° rotational symmetry around the central axis O1 in the front view of the first surface 3 as in the non-limiting embodiment illustrated in FIG. 2. The first lateral surface 15, the second lateral surface 17 and the third lateral surface 21 may be located so as to have 120° rotational symmetry around the central axis O1.

A maximum width of the first surface 3 in the front view thereof may be, for example, 6-25 mm. A height from the first surface 3 to the second surface 5 may be, for example, 1-10 mm. Here, the height from the first surface 3 to the second surface may denote a maximum value of a space between the first surface 3 and the second surface 5 in a direction parallel to the central axis O1.

The insert 1 may include the through hole 9 that opens into the first surface 3 as in the non-limiting embodiment illustrated in FIG. 1. The through hole 9 may be formed from the center of the first surface 3 toward the center of the second surface 5 as in the non-limiting embodiment illustrated in FIG. 1. The through hole 9 may open into the second surface 5. In cases where the through hole 9 is formed from the center of the first surface 3 toward the center of the second surface 5 as in the non-limiting embodiment illustrated in FIG. 1, a central axis of the through hole 9 may coincide with the central axis O1.

The through hole 9 may be usable for inserting, for example, a screw when fixing the insert 1 to the holder. Instead of the screw, for example, a clamping member may be used to fix the insert 1 to the holder. Although the through hole 9 is formed from the center of the first surface 3 toward the center of the second surface 5 in the non-limiting embodiment illustrated in FIG. 1, the through hole 9 is not limited to the above configuration. For example, the through hole 9 may open into regions in the lateral surface 7 which are opposed to each other.

Figure 3:
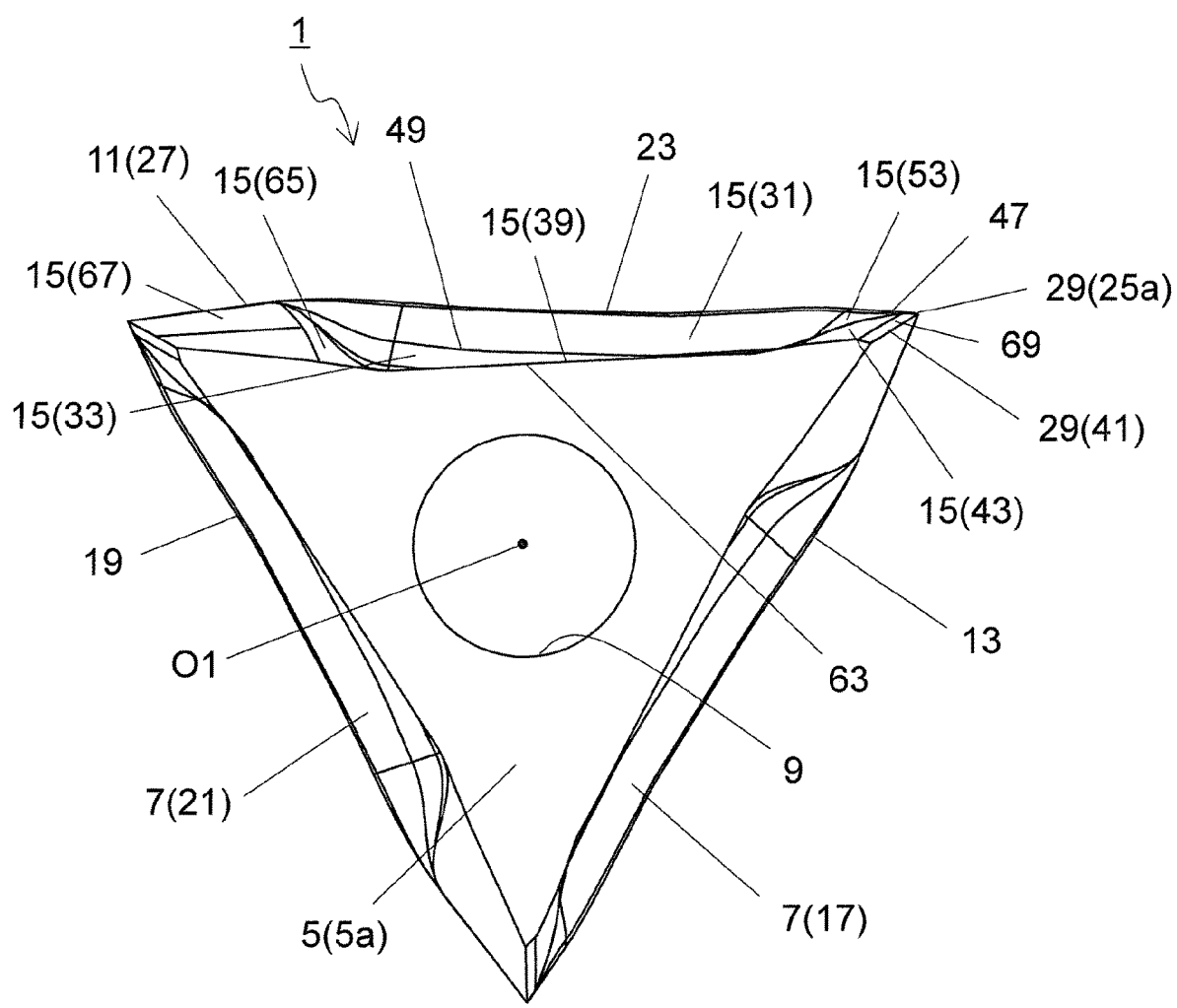
FIG. 3 is a plan view of the cutting insert illustrated in FIG. 1 as viewed from a side of a second surface.

The second surface 5 may include a flat surface region 5a located so as to surround the opening of the through hole 9 as illustrated in FIG. 3. If the second surface 5 includes the surface region 5a, the insert 1 may be stably fixable to the holder.

Specifically, the surface region 5a may be orthogonal to the central axis O1. If the surface region 5a is orthogonal to the central axis, the insert 1 may be more stably fixable to the holder. In cases where the second surface 5 includes the surface region 5a, the surface region 5a may correspond to a first reference plane in order to determine a positional relationship in a direction along the central axis O1.

The insert 1 may include a cutting edge. The cutting edge may be usable for cutting a workpiece during manufacturing a machined product by using the insert 1. The cutting edge may include a first cutting edge 23 and a second cutting edge 25. The first cutting edge 23 may be located on at least a part of a first ridgeline 27 where the first surface 3 intersects with the first lateral surface 15. The second cutting edge 25 may be located on at least a part of a second ridgeline 29 where the first lateral surface 15 intersects with the second lateral surface 17.

The first cutting edge 23 may be located on the whole of the first ridgeline 27, or may be partially located at a region on the first ridgeline 27 which includes an end portion on a side close to the second lateral surface 17. The second cutting edge 25 may be located on the whole of the second ridgeline 29, or may be partially located at a region on the second ridgeline 29 which includes an end portion on a side close to the first surface 3.

For example, the second cutting edge 25 may be used as a bottom cutting edge during a cutting process of a workpiece by using the insert 1 in non-limiting aspects of the present disclosure. Alternatively, the first cutting edge 23 may be used as an outer peripheral cutting edge. In cases where the second cutting edge 25 is used as the bottom cutting edge and the first cutting edge 23 is used as the outer peripheral cutting edge as described above, the first cutting edge 23 may mainly contribute to the cutting process. The first cutting edge 23 may therefore be referred to as a main cutting edge in some cases. A larger cutting load may be applied to the first cutting edge 23 than the second cutting edge 25 in some cases.

In cases where the three sides of the first surface 3 are located so as to have 120° rotational symmetry around the central axis O1, a portion of the cutting edge which corresponds to the first cutting edge 23 may be located on a ridgeline where the first surface 3 intersects with the second lateral surface 17, and on a ridgeline where the first surface 3 intersects with the third lateral surface 21.

In cases where the first lateral surface 15, the second lateral surface 17 and the third lateral surface 21 may be located so as to have 120° rotational symmetry around the central axis O1, a portion of the cutting edge which corresponds to the second cutting edge 25 may be located on a ridgeline where the second surface 17 intersects with the third lateral surface 21, and on a ridgeline where the third lateral surface 21 intersects with the first lateral surface 15.

Figure 4:
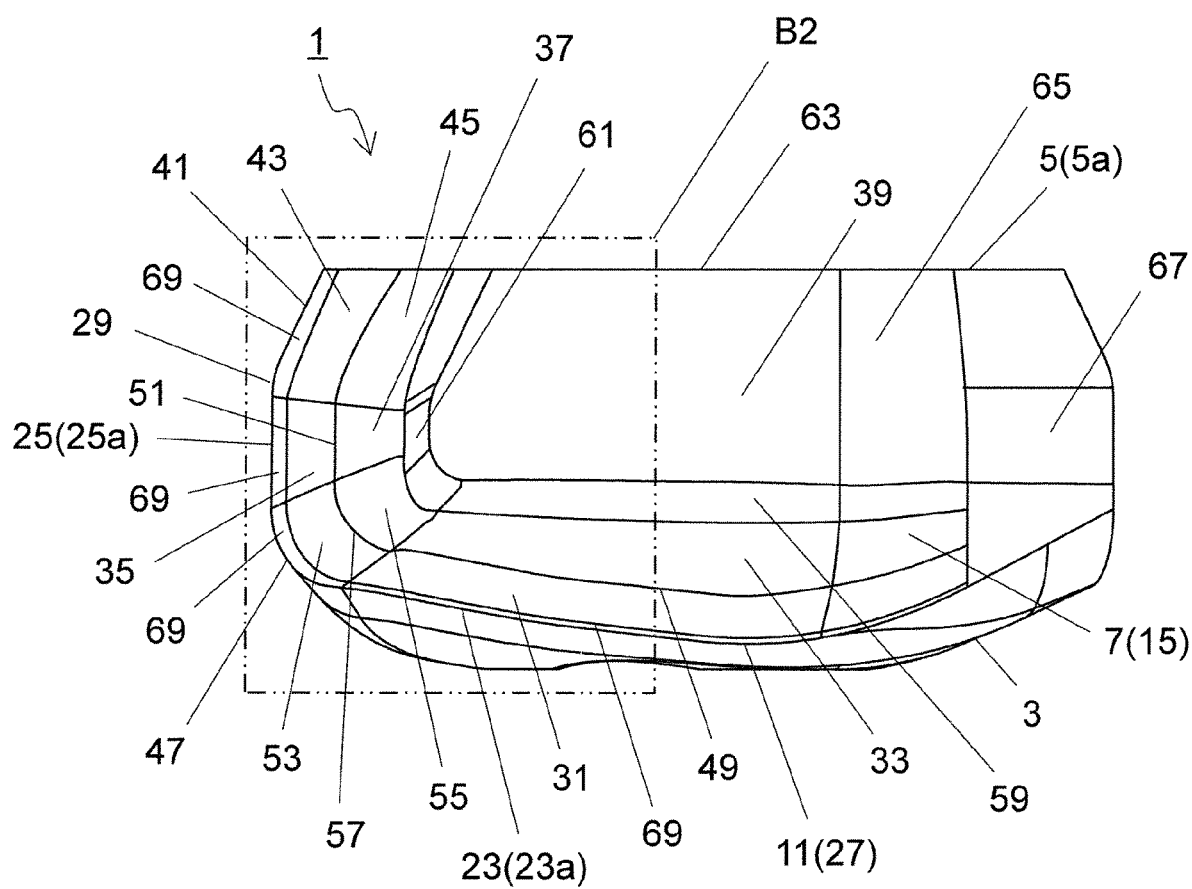
FIG. 4 is a side view of the cutting insert illustrated in FIG. 2 as viewed from an A1 direction.

As in the non-limiting embodiment illustrated in FIG. 4, the first lateral surface 15 may have an approximately rectangular shape whose width in a direction along the first ridgeline 27 is larger than a width thereof in a direction along the second ridgeline 29. The first lateral surface 15 may include a first inclined surface 31, a second inclined surface 33, a third inclined surface 35, a fourth inclined surface 37 and a flat surface 39 in the present disclosure. The first inclined surface 31 may be a surface region located along the first ridgeline 27. More specifically, the first inclined surface 31 may be a surface region located along the first cutting edge 23 on the first ridgeline 27 in the non-limiting embodiment illustrated in FIG. 4. In other words, the first cutting edge 23 may be located including a part thereof along the first inclined surface 31.

The second inclined surface 33 may be a surface region which is located more inside the first lateral surface 15 than the first inclined surface 31, and which is located along the first inclined surface 31. The first inclined surface 31 and the second inclined surface 33 may be located away from the second ridgeline 29 as in the non-limiting embodiment illustrated in FIG. 4.

The third inclined surface 35 may be a surface region located along the second ridgeline 29. More specifically, the third inclined surface 35 may be a surface region located along the second cutting edge 25 on the second ridgeline 29 as in the non-limiting embodiment illustrated in FIG. 4. In other words, the second cutting edge 25 may be located including a part thereof along the third inclined surface 31.

The fourth inclined surface 37 may be a surface region which is located more inside the first lateral surface 15 than the third inclined surface 35, and which is located along the third inclined surface 35. The third inclined surface 35 and the fourth inclined surface 37 may be located away from the first ridgeline 27 as in the non-limiting embodiment illustrated in FIG. 4.

The flat surface 39 may be a flat surface region located along the second inclined surface 33 and the fourth inclined surface 37. The first inclined surface 31, the second inclined surface 33, the third inclined surface 35 and the fourth inclined surface 37 may be inclined relative to the flat surface 39.

The flat surface 39 is not limited to a strict flat surface. The flat surface 39 may be approximately flat and may have a slight curve or slight irregularities to the extent that the curve or irregularities cannot be observed in a general view of the insert 1. Specifically, for example, the flat surface 39 may have slight irregularities of approximately several tens of μm.

An imaginary flat surface that is parallel to the flat surface 39 and located more inside than the first lateral surface 15 may be denoted by a second reference plane S2. The phrase "being located more inside than the first lateral surface 15" may denote being located closer to the central axis O1 than the first lateral surface 15 in a front view of the first surface 3.

The first inclined surface 31, the second inclined surface 33, the third inclined surface 35 and the fourth inclined surface 37 may be individually usable as a rake surface. The flat surface 39 may also be usable as a surface brought into contact with a pocket of the holder when fixing the insert 1 to the holder. Because the flat surface 39 is flat, the insert 1 may be stably fixable to the holder.

Figure 9:
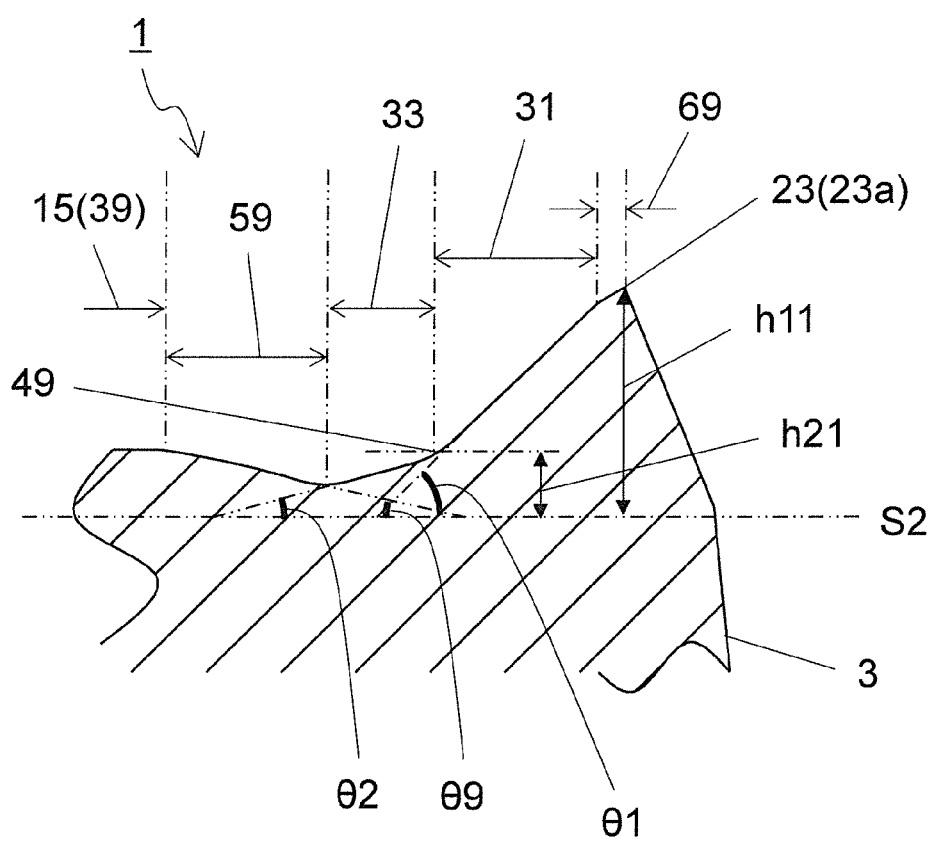
FIG. 9 is a cross-sectional view taken along the line IX-IX in a cutting insert illustrated in FIG. 8.
Figure 10:
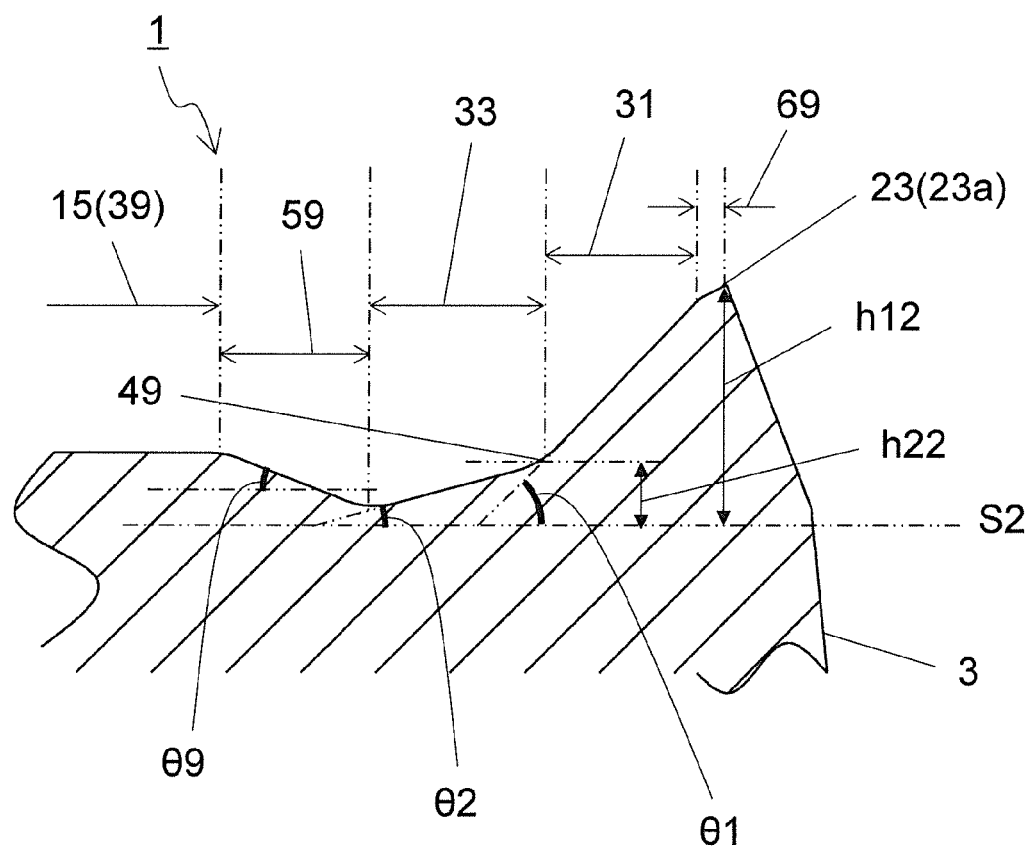
FIG. 10 is a cross-sectional view taken along the line X-X in the cutting insert illustrated in FIG. 8.
Figure 11:
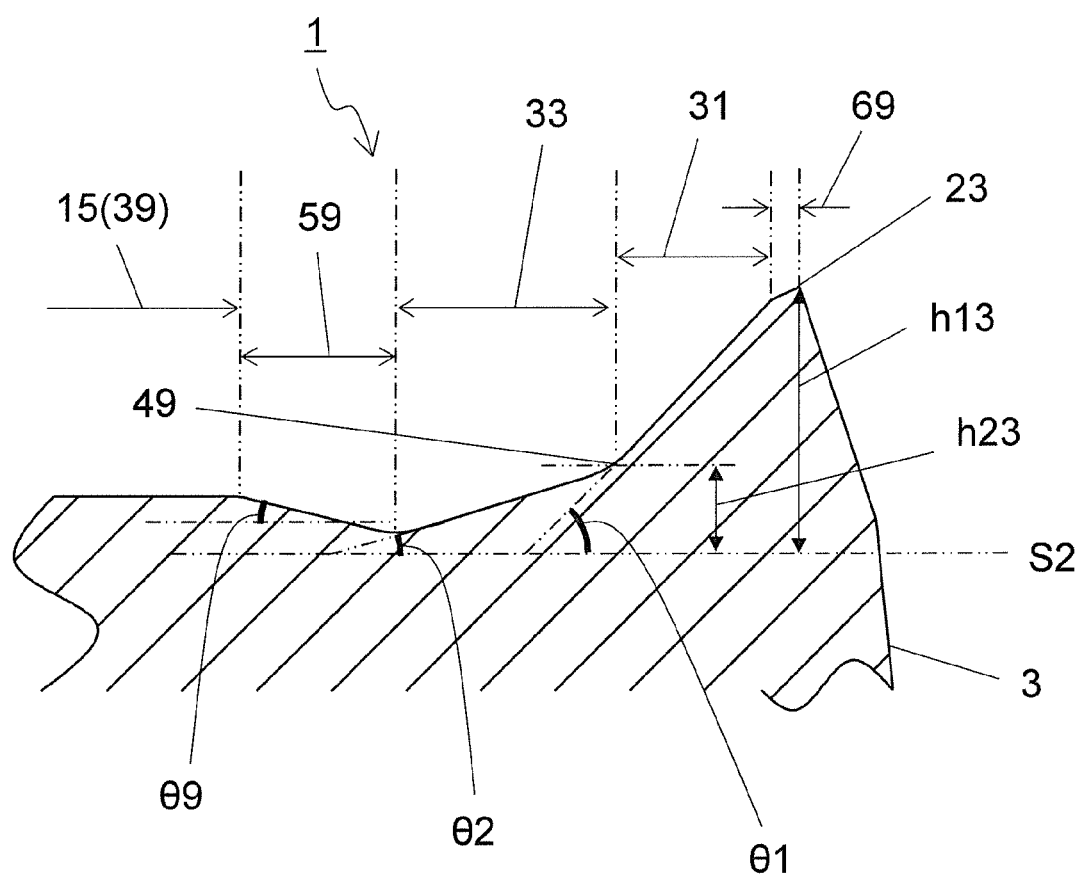
FIG. 11 is a cross-sectional view taken along the line XI-XI in the cutting insert illustrated in FIG. 8.

The first inclined surface 31 and the second inclined surface 33 may be individually inclined so as to become closer to the second reference plane S2 as going away from the first ridgeline 27. For example, as illustrated in FIGS. 9 to 11, the first inclined surface 31 and the second inclined surface 33 may be illustrated in a state of being inclined so as to be directed from upper right to lower left in a cross section orthogonal to the first ridgeline 27 (the first cutting edge 23) in a front view of the first lateral surface 15.

In cases where the surface region formed by the first inclined surface 31 and the second inclined surface 33 is inclined so as to become closer to the second reference plane S2 as going away from the first ridgeline 27 as described above, chips generated by the first ridgeline 27 can be stably controlled on the surface region.

Figure 12:
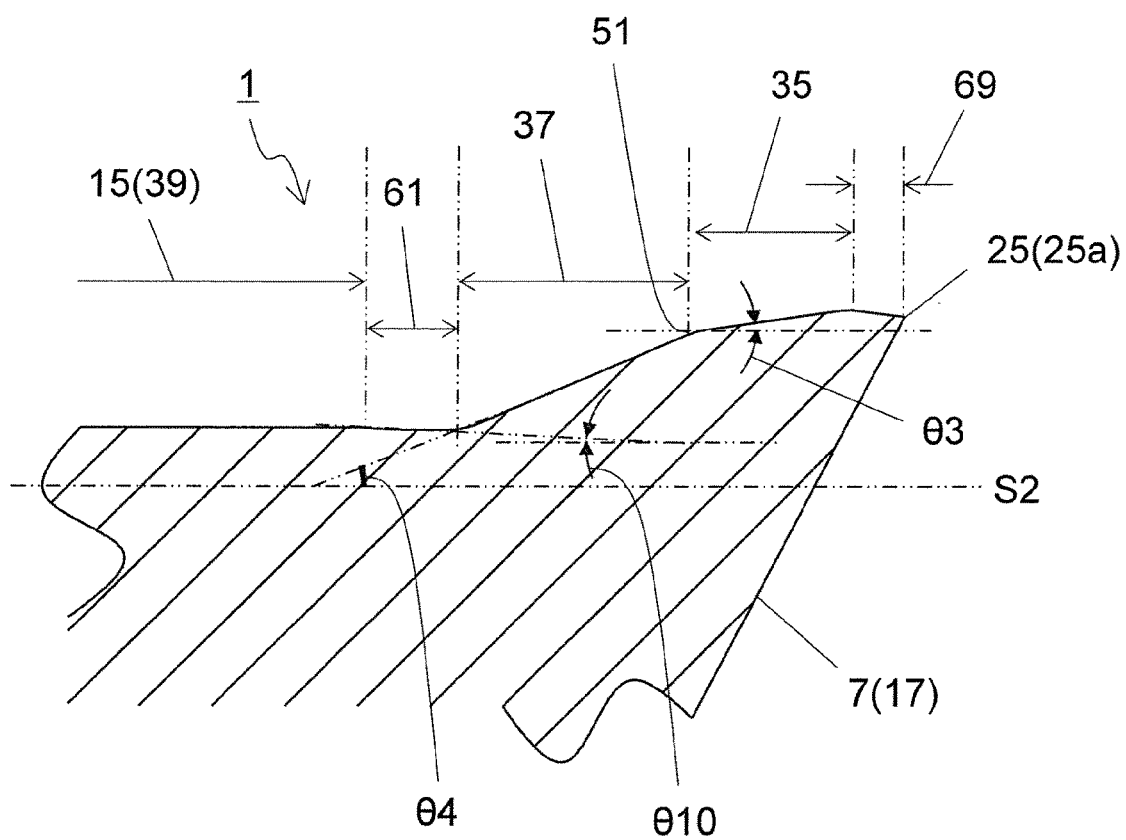
FIG. 12 is a cross-sectional view taken along the line XII-XII in the cutting insert illustrated in FIG. 8.

The third inclined surface 35 and the fourth inclined surface 37 may be individually inclined so as to become closer to the second reference plane S2 as going away from the second ridgeline 29. For example, as illustrated in FIG. 12, the third inclined surface 35 and the fourth inclined surface 37 may be illustrated in a state of being inclined so as to be directed from upper right to lower left in a cross section orthogonal to the second ridgeline 29 (the second cutting edge 25) in the front view of the first lateral surface 15.

In cases where the surface region formed by the third inclined surface 35 and the fourth inclined surface 37 is inclined so as to become closer to the second reference plane S2 as going away from the second ridgeline 29 as described above, chips generated by the second cutting edge 25 can be stably controlled on the above surface region.

A second inclination angle θ2 of the second inclined surface 33 relative to the second reference plane S2 may be smaller than a first inclination angle θ1 of the first inclined surface 31 relative to the second reference plane S2 as illustrated in FIGS. 9 to 11. FIG. 9 may be a cross section which is taken along the line IX-IX in the cutting insert 1 illustrated in FIG. 8, and which is orthogonal to the first ridgeline 27 (the first cutting edge 23) in the front view of the first lateral surface 15. FIG. 10 may be a cross section which is taken along the line X-X in the cutting insert 1 illustrated in FIG. 8, and which is orthogonal to the first ridgeline 27 (the first cutting edge 23) in the front view of the first lateral surface 15. FIG. 11 may be a cross section which is taken along the line XI-XI in the cutting insert 1 illustrated in FIG. 8, and which is orthogonal to the first ridgeline 27 (the first cutting edge 23) in the front view of the first lateral surface 15.

In cases where the second inclination angle θ2 is smaller than the first inclination angle θ1 as illustrated in FIGS. 9 to 11, the surface region formed by the first inclined surface 31 and the second inclined surface 33 may have a concavely curved shape. Consequently, chips generated by the first cutting edge 23 can be stably curled on the surface region formed by the first inclined surface 31 and the second inclined surface 33.

A width of the first lateral surface 15 in a direction along the second ridgeline 29 may be smaller than a width thereof in a direction along the first ridgeline 27 in the non-limiting embodiment illustrated in FIG. 4. Even so, the chips generated by the first cutting edge 23 can be stably curled on the surface region formed by the first inclined surface 31 and the second inclined surface 33. This may lead to efficient chip disposal.

A fourth inclination angle θ4 of the fourth inclined surface 37 relative to the second reference plane S2 may be larger than a third inclination angle θ3 of the third inclined surface 35 relative to the second reference plane S2 as illustrated in FIG. 12 or the like. FIG. 12 may be a cross section which is taken along the line XII-XII in the cutting insert 1 illustrated in FIG. 8, and which is orthogonal to the second ridgeline 29 (the second cutting edge 25) in the front view of the first lateral surface 15.

In cases where the fourth inclination angle θ4 is larger than the third inclination angle θ3 as illustrated in FIG. 12 or the like, the surface region formed by the third inclined surface 35 and the fourth inclined surface 37 may have a convexly curved shape. A width of the first lateral surface 15 in a direction along the first ridgeline 27 may be larger than a width thereof in a direction along the second ridgeline 29 in the non-limiting embodiment illustrated in FIG. 4. Even so, chips generated by the second cutting edge 25 may tend to flow in a direction orthogonal to the second ridgeline 29. The chips generated by the second cutting edge 25 may be less likely to be accumulated in the vicinity of the second cutting edge 25. This may lead to efficient chip disposal.

Because the first surface 3 has the triangular shape in the non-limiting embodiment illustrated in FIG. 1, the insert 1 in the vicinity of the second cutting edge 25 may tend to have a small thickness. However, because the surface region formed by the third inclined surface 35 and the fourth inclined surface 37 has the convexly curved shape, it may be easy to ensure the thickness of the insert 1 in the vicinity of the second cutting edge 25. The insert 1 may therefore have high durability.

For example, cemented carbide and cermet may be usable as a material of the insert 1. Examples of composition of the cemented carbide may include WC—Co, WC—TiC—Co and WC—TiC—TaC—Co, in which WC, TiC and TaC are hard particles, and Co is a binding phase.

The cermet may be a sintered composite material obtainable by compositing metal into a ceramic component. Examples of the cermet may include titanium compounds composed mainly of titanium carbide (TiC) or titanium nitride (TiN). The material of the insert 11 is not limited to the above composition.

A surface of the insert 1 may be coated with a coating film by using chemical vapor deposition (CVD) method or physical vapor deposition (PVD) method. Examples of composition of the coating film may include titanium carbide (TiC), titanium nitride (TiN), titanium carbonitride (TiCN) and alumina ($Al_2O_3$).

The first cutting edge 23 located on at least a part of the first ridgeline 27 may include a part thereof that is located further away from the second reference plane S2 as going away from the second ridgeline 29. For example, a height of the first cutting edge 23 from the second reference plane S2 in the non-limiting embodiment illustrated in FIG. 9 may be denoted by h11. A height of the first cutting edge 23 from the second reference plane S2 in the non-limiting embodiment illustrated in FIG. 10 may be denoted by h12. A height of the first cutting edge 23 from the second reference plane S2 in the non-limiting embodiment illustrated in FIG. 11 may be denoted by h13. The insert 1 may satisfy a relationship of h11<h12<h13 as in the non-limiting embodiment illustrated in FIGS. 9 to 11.

If the first cutting edge 23 has the above configuration, chips generated by the first cutting edge 23 may tend to flow in a direction away from the second ridgeline 29. Hence, a flow of the chips generated by the second cutting edge 25 located on at least a part of the second ridgeline 29 may be less likely to be hindered, thus leading to efficient chip disposal.

The phrase that "the first cutting edge 23 is located further away from the second reference plane S2 as going away from the second ridgeline 29" may denote that at least the first cutting edge 23 does not become closer to the second reference plane S2 as going away from the second ridgeline 29. Accordingly, the first cutting edge 23 may partially include a portion whose height from the second reference plane S2 is constant.

In cases where the entirety of the first cutting edge 23 is configured to be located away from the second reference plane S2 as going away from the second ridgeline 29, instead of the configuration that the first cutting edge 23 partially includes the portion whose height from the second reference plane S2 is constant, the chips generated by the first cutting edge 23 may be more likely to flow in a direction away from the second ridgeline 29. This may lead to more efficient chip disposal.

Figure 6:
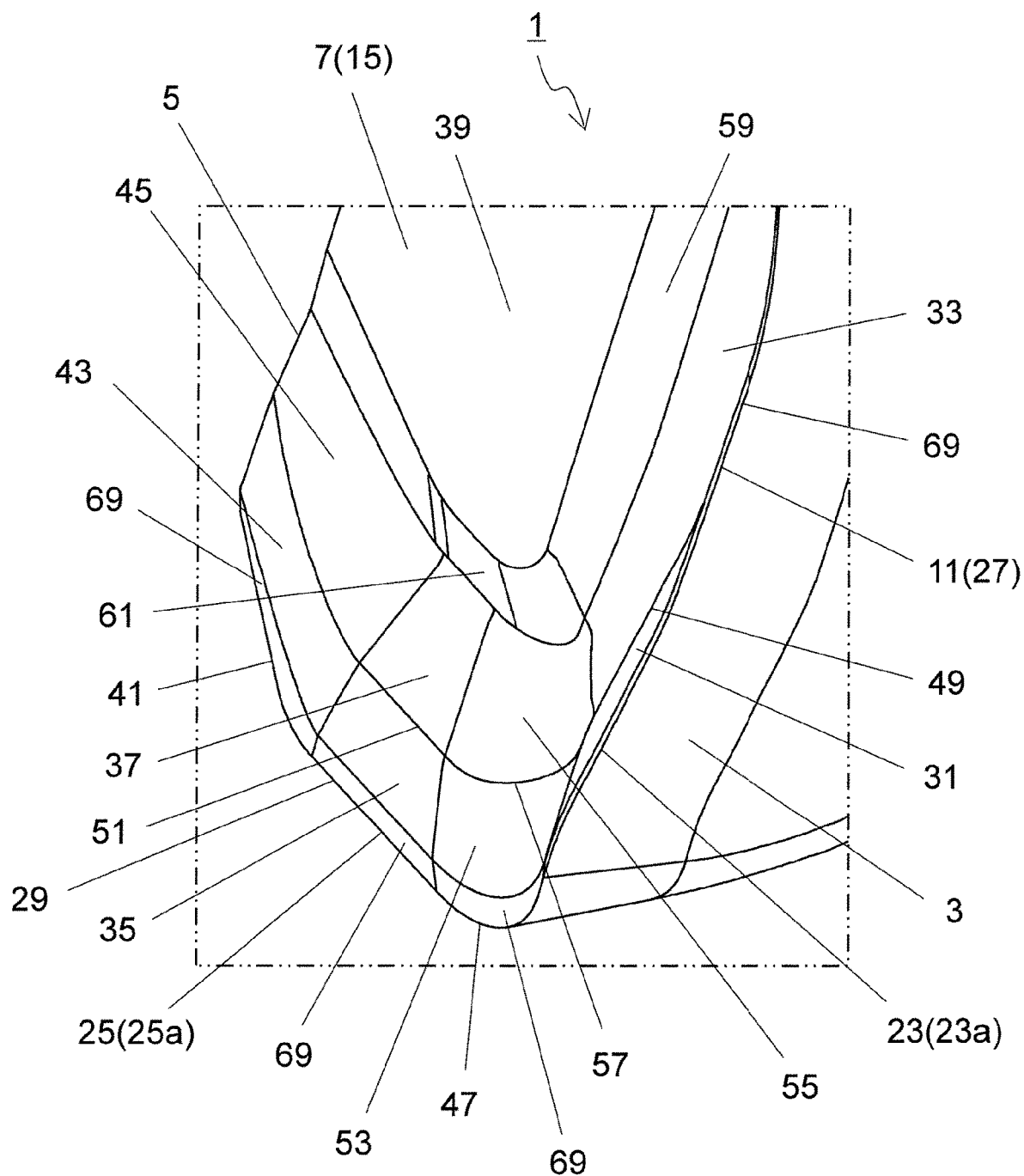
FIG. 6 is an enlarged view of a region B1 illustrated in FIG. 1.

The second cutting edge 25 located on at least a part of the second ridgeline 29 may include a part thereof whose height from the second reference plane S2 is constant as in the non-limiting embodiment illustrated in FIG. 6. With the second cutting edge 25 having the above configuration, the chips generated by the second cutting edge 25 may be less likely to flow to an inner peripheral side of the holder, for example, if the second cutting edge 25 is used as the bottom cutting edge.

Consequently, the chips generated by the second cutting edge 25 may be less likely to be excessively accumulated in a pocket of the holder. This may lead to efficient chip disposal. If the second cutting edge 25 is used as the bottom cutting edge, it may be easy to improve surface accuracy of a finished surface of a workpiece without depending on an axial rake of the insert 1.

The phrase that "the height of the second cutting edge 25 from the second reference plane S2 is constant" may not denote a strict constant height. A portion having the largest height from the flat surface 39 may be shifted approximately 2-3% relative to a portion having the lowest height from the flat surface 39.

In cases where the second cutting edge 25 is partially located at a part of the second ridgeline 29 which includes an end portion on a side close to the first surface 3 as in the non-limiting embodiment illustrated in FIG. 4, the insert 1 may further include a third cutting edge 41 located on the second ridgeline 29. For example, the insert 1 may further include the third cutting edge 41 located on a side further away from the first ridgeline than the second cutting edge 25 on the second ridge line 29 as illustrated in FIG. 4.

The third cutting edge 41 may be inclined relative to the second cutting edge 25 in the front view of the first lateral surface 15. For example, the third cutting edge 41 may be usable as a cutting edge for slant milling in a cutting process of a workpiece by using the insert 1 in the non-limiting aspects of the present disclosure. The third cutting edge 41 is not limited to a specific shape but may have, for example, a straight line shape as illustrated in FIG. 4.

Figure 5:
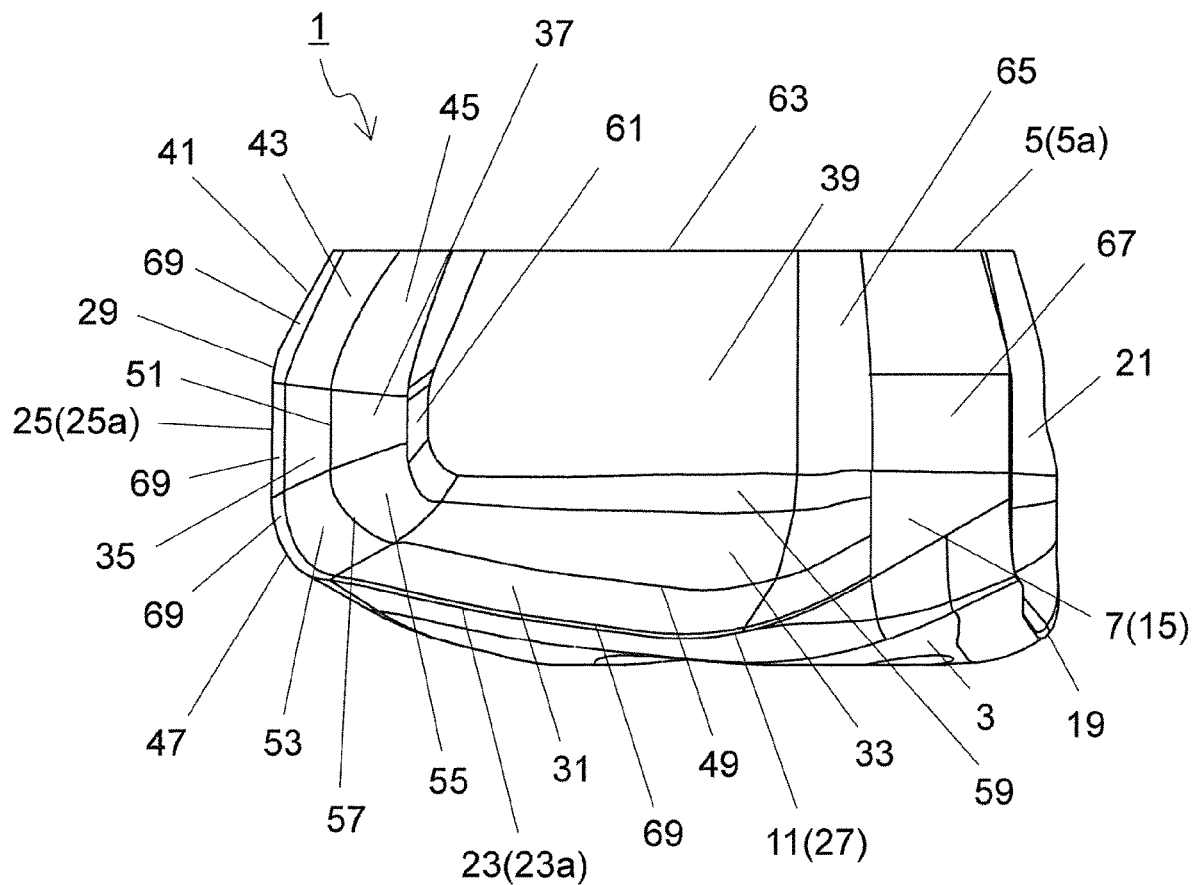
FIG. 5 is a side view of the cutting insert illustrated in FIG. 2 as viewed from an A2 direction.

Alternatively, the third cutting edge 41 may become closer to the second reference plane S2 as going away from the second cutting edge 25 as in the non-limiting embodiment illustrated in FIG. 5. With the third cutting edge 41 having the above configuration, chips generated by the third cutting edge 41 may tend to flow to an outer peripheral side of the holder, for example, if the third cutting edge 41 is used as the cutting edge for the slant milling. Consequently, the chips generated by the third cutting edge 41 may be less likely to be excessively accumulated in the pocket of the holder. This may lead to efficient chip disposal.

If the insert 1 includes the third cutting edge 41, the first lateral surface 15 may further include a fifth inclined surface 43 and a sixth inclined surface 45. The fifth inclined surface 43 may be a surface region located along the third cutting edge 41 on the second ridgeline 29. The sixth inclined surface 45 may be a surface region which is located more inside the first lateral surface 15 than the fifth inclined surface 43, and which is located along the fifth inclined surface 43.

Figure 13:
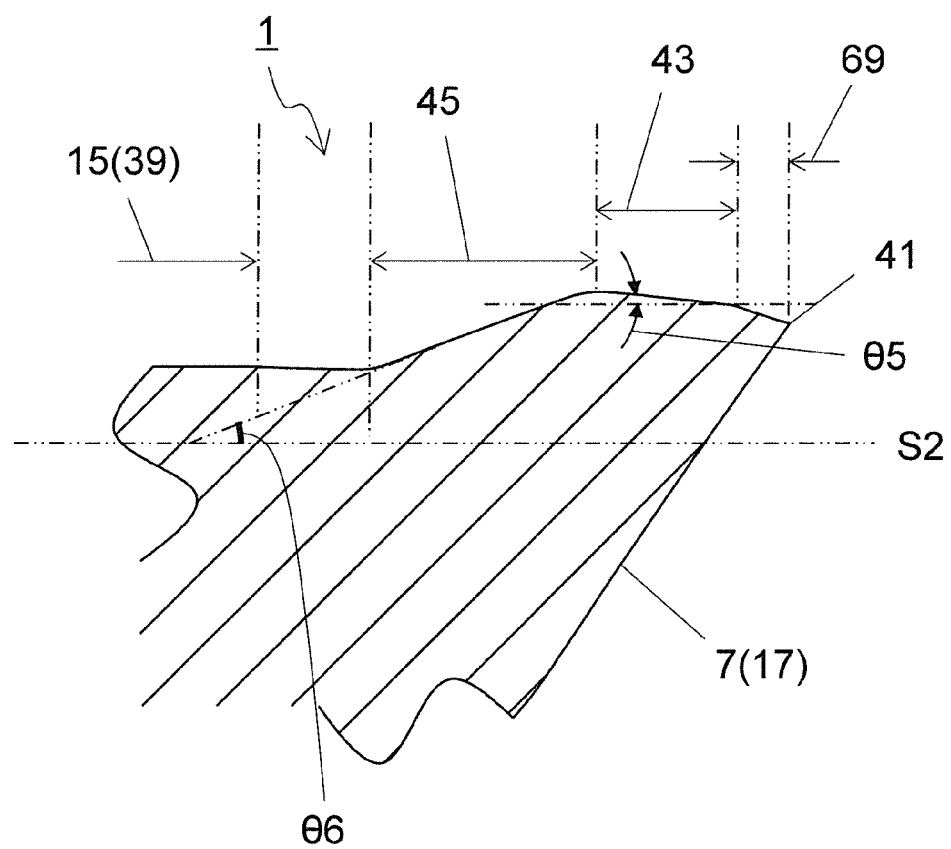
FIG. 13 is a cross-sectional view taken along the line XIII-XIII in the cutting insert illustrated in FIG. 8.

The fifth inclined surface 43 may be inclined so as to be located away from the second reference plane S2 as going away from the second ridgeline 29 (the third cutting edge 41). The sixth inclined surface 45 may be inclined so as to become closer to the second reference plane S2 as going away from the fifth inclined surface 43. For example, as illustrated in FIG. 13, the fifth inclined surface 43 may be illustrated in a state of being inclined so as to be directed from lower right to upper left, and the sixth inclined surface 45 may be illustrated in a state of being inclined so as to be directed from upper right to lower left in the cross section orthogonal to the second ridgeline 29 (the third cutting edge 41) in the front view of the first lateral surface 15.

If the third cutting edge 41 is used as the cutting edge for slant milling, the third cutting edge 41 may be located on a further inner peripheral side of the holder than the first cutting edge 23 and the second cutting edge 25. Therefore, the third cutting edge 41 may be more susceptible to a large cutting load than the first cutting edge 23 and the second cutting edge 25 during the cutting process. However, if the fifth inclined surface 43 is inclined so as to be located away from the second reference plane S2 as going away from the second ridgeline 29 (the third cutting edge 41), the third cutting edge 41 may have enhanced strength. This may lead to enhanced durability of the insert 1.

In cases where the fifth inclined surface 43 is inclined as described above and the sixth inclined surface 45 is inclined so as to become closer to the second reference plane S2 as going away from the fifth inclined surface 43, the sixth inclined surface 45 can be served as a rake surface. Chips generated by the third cutting edge 41 may therefore be less likely to be accumulated, thus leading to efficient chip disposal. Thus, with the insert 1 including the third cutting edge 41, the fifth inclined surface 43 and the sixth inclined surface 45, a degree of freedom of the cutting process can be increased.

In cases where the first lateral surface 15 includes the fifth inclined surface 43 and the sixth inclined surface 45, a fifth inclination angle θ5 of the fifth inclined surface 43 relative to the second reference plane S2 and a sixth inclination angle θ6 of the sixth inclined surface 45 relative to the second reference plane S2 are not limited to a specific value. For example, as illustrated in FIG. 13, the sixth inclination angle θ6 may be larger than the fifth inclination angle θ5 in a cross section orthogonal to the second ridgeline 29 in the front view of the first lateral surface 15. If the fifth inclination angle θ5 and the sixth inclination angle θ6 have the above relationship, chips generated by the third cutting edge 41 may tend to flow on the sixth inclined surface 45. The chips after flowing on the sixth inclined surface 45 may therefore be less likely to be curled and flow to the third cutting edge 41, thus leading to stable chip disposal.

The cutting edge may include the first cutting edge 23 and the second cutting edge 25 in the insert 1 of the present disclosure. Alternatively, the insert 1 may further include a corner cutting edge 47 as a cutting edge.

Specifically, the insert 1 may further include the corner cutting edge 47 located at a part connecting to each of the first ridgeline 27 and the second ridgeline 29 as in the non-limiting embodiment illustrated in FIG. 6. The corner cutting edge 47 may have a convex curvilinear shape that is protruded outward. In other words, the corner cutting edge 47 may be located between the first cutting edge 23 and the second cutting edge 25 on an outer peripheral edge of the first lateral surface 15.

The cutting edges may have enhanced durability if the insert 1 includes the above corner cutting edge 47. The shape of the corner cutting edge 47 in the front view of the first lateral surface 15 may only need to have the convex curvilinear shape. The corner cutting edge 47 may have a circular arc shape as in the non-limiting embodiment illustrated in FIG. 7.

In cases where the insert 1 includes the corner cutting edge 47, an end portion of the first ridgeline 27 which is located on a side close to the second lateral surface 17 may denote a boundary between the first ridgeline 27 and the corner cutting edge 47. If the insert 1 includes the corner cutting edge 47, an end portion of the second ridgeline 29 which is located on a side close to the first lateral surface 15 may denote a boundary between the second ridgeline 29 and the corner cutting edge 47.

In cases where the insert 1 does not include the corner cutting edge 47 and the first ridgeline 27 connects to the second ridgeline 29, an end portion of the first ridgeline 27 which is located on a side close to the second lateral surface 17 may denote a boundary between the first ridgeline 27 and the second ridgeline 29.

If the insert 1 includes the corner cutting edge 47, the first cutting edge 23 may include a first straight line part 23a connecting to the corner cutting edge 47. The first straight line part 23a may have a straight line shape in the front view of the first lateral surface 15. If the first cutting edge 23 includes the first straight line part 23a, a cutting load may be less likely to be accumulated in the vicinity of a boundary between the first cutting edge 23 and the corner cutting edge 47. This may lead to enhanced durability of the cutting edges.

If the insert 1 includes the corner cutting edge 47, the second cutting edge 25 may include a second straight line part 25a connecting to the corner cutting edge 47. The second straight line part 25 may have a straight line shape in the front view of the first lateral surface 15. If the second cutting edge 25 includes the second straight line part 25a, a cutting load may be less likely to be accumulated in the vicinity of a boundary between the second cutting edge 25 and the corner cutting edge 47. This may lead to enhanced durability of the cutting edges.

An angle ψ formed by an extension line of the first straight line part 23a and an extension line of the second straight line part 25a may be an obtuse angle in the front view of the first lateral surface 15. In this case, a cutting load may be less likely to be accumulated in a region from the first straight line part 23a including the corner cutting edge 47 to the second straight line part 25a. This may lead to the enhanced durability of the cutting edges.

The first straight line part 23a and the second straight line part 25a may only need to approximately look like a sufficiently straight line shape and may not be a strict straight line shape as compared with the corner cutting edge 47 having the convex curvilinear shape in the front view of the first lateral surface 15.

For example, even if the first straight line part 23a and the second straight line part 25a have a gentle curvilinear shape in the front view of the first lateral surface 15, the first straight line part 23a and the second straight line part 25a may be regarded as being the straight line shape if a radius of curvature of each of the first straight line part 23a and the second straight line part 25a is not less than 10 times a radius of curvature of the corner cutting edge 47. Alternatively, the first cutting edge 23 may have, for example, a curvilinear shape in the front view of the first surface 3.

As stated earlier, the first lateral surface 15 may include the first inclined surface 31 and the second inclined surface 33 in the non-limiting embodiment illustrated in FIG. 6. The second inclined surface 33 may be located away from the first inclined surface 31, and the second inclined surface 33 may be adjacent to the first inclined surface 31 as in the non-limiting embodiment illustrated in FIG. 6. A ridgeline may be located at a part where the first inclined surface 31 intersects with the second inclined surface 33 in the non-limiting embodiment illustrated in FIG. 6. The ridgeline located at the boundary part between the first inclined surface 31 and the second inclined surface 33 may be denoted by a first boundary line 49.

The first boundary line 49 may include a part thereof located further away from the second reference plane S2 as going away from the second ridgeline 29 as in the non-limiting embodiment illustrated in FIGS. 9 to 11. For example, a height of the first boundary line 49 in the non-limiting embodiment illustrated in FIG. 9 from the second reference plane S2 may be denoted by h21. A height of the first boundary line 49 in the non-limiting embodiment illustrated in FIG. 10 from the second reference plane S2 may be denoted by h22. A height of the first boundary line 49 in the non-limiting embodiment illustrated in FIG. 11 from the second reference plane S2 may be denoted by h23. These may have a relationship of $h21<h22<h23$ as in the non-limiting embodiment illustrated in FIGS. 9 to 11.

With the first boundary line 49 having the above configuration, if chips generated by the first cutting edge 23 flow from the first inclined surface 31 to the second inclined surface 33, the chips may tend to flow in a direction away from the second ridgeline 29.

Consequently, a hindrance may be less likely to occur in the flow of chips generated by the second cutting edge 25 located on at least a part of the second ridgeline 29. This may lead to efficient chip disposal. In particular, if the entirety of the first boundary line 49 is located further away from the second reference plane S2 as going away from the second ridgeline 29, more efficient chip disposal may be achievable.

Figure 7:
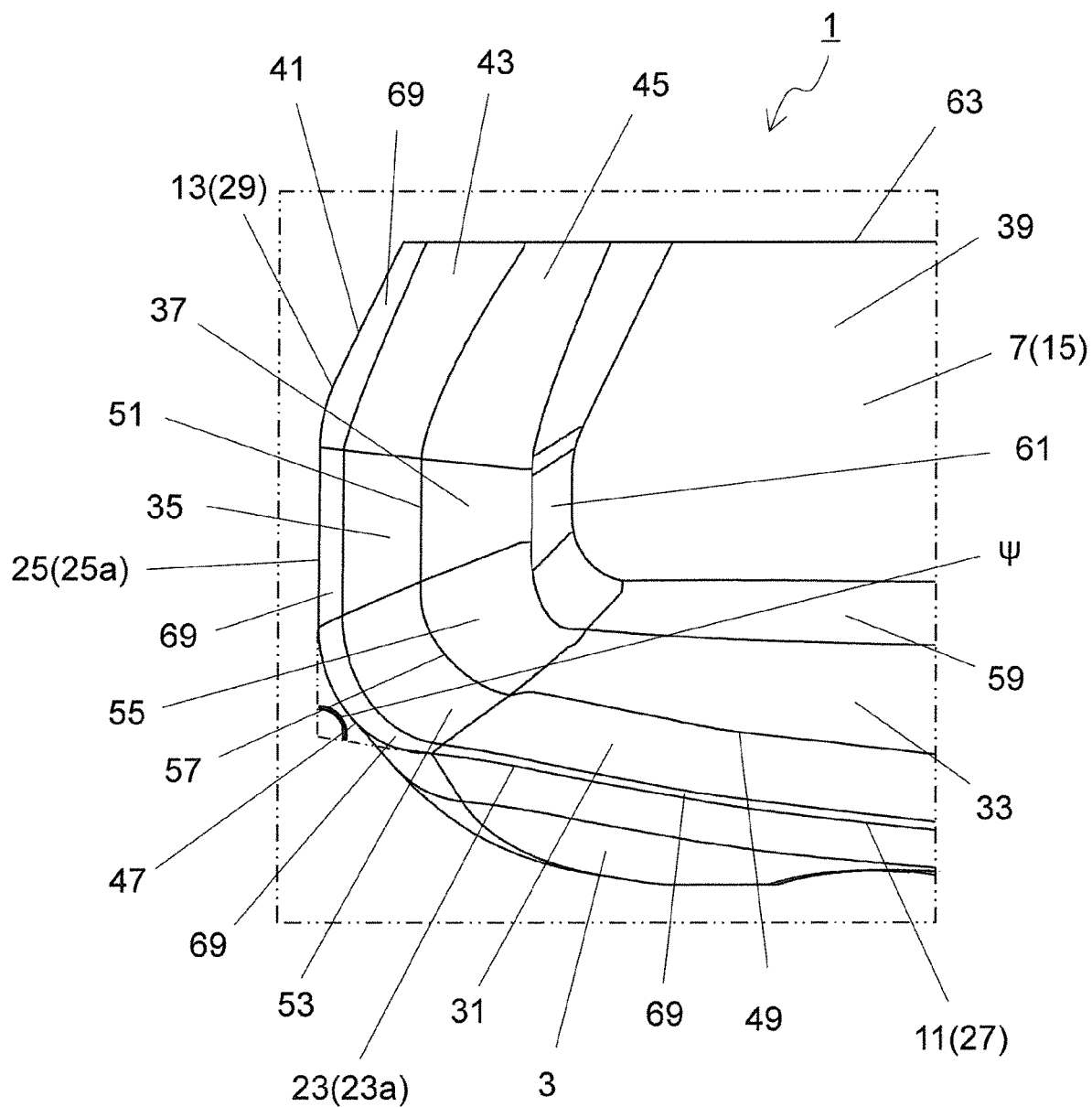
FIG. 7 is an enlarged view of a region B2 illustrated in FIG. 4.

As stated earlier, the first lateral surface 15 in the non-limiting embodiment illustrated in FIG. 7 may include the third inclined surface 35 and the fourth inclined surface 37. The fourth inclined surface 37 may be located away from the third inclined surface 35. Alternatively, the fourth inclined surface 37 may be adjacent to the third inclined surface 35 as in the non-limiting embodiment illustrated in FIG. 7. A ridgeline may be located on a portion where the third inclined surface 35 intersects with the fourth inclined surface 37 in the non-limiting embodiment illustrated in FIG. 7. The ridgeline located at a boundary portion between the third inclined surface 35 and the fourth inclined surface 37 may be denoted by a second boundary line 51.

The second boundary line 51 may be configured so that a height thereof from the second reference plane S2 is constant as in the non-limiting embodiment illustrated in FIG. 6. If the second boundary line 51 is thus configured, for example, the second cutting edge 25 is usable as a bottom cutting edge, chips generated by the second cutting edge 25 may be less likely to flow to the inner peripheral side of the holder during the time when the chips generated by the second cutting edge 25 flow from the first inclined surface 31 to the second inclined surface 33.

Consequently, the chips generated by the second cutting edge 25 may be less likely to be excessively accumulated in the pocket of the holder. This may lead to efficient chip disposal. In particular, if the entirety of the second boundary line 51 is configured so that a height thereof from the second reference plane S2 is constant, more efficient chip disposal may be achievable.

If the insert 1 includes the corner cutting edge 47, the first lateral surface 15 may further include a seventh inclined surface 53 and an eighth inclined surface 55 as in the non-limiting embodiment illustrated in FIG. 7. The seventh inclined surface 53 may be located along the corner cutting edge 47. The eighth inclined surface 55 may be located more inside the first lateral surface 15 than the seventh inclined surface 53. The eighth inclined surface 55 may be located along the seventh inclined surface 53. The seventh inclined surface 53 and the eighth inclined surface 55 may be usable as a rake surface.

The seventh inclined surface 53 and the eighth inclined surface 55 may be individually inclined so as to become closer to the second reference plane S2 as going away from the corner cutting edge 47 in the non-limiting embodiment illustrated in FIG. 7. For example, as illustrated in FIGS. 14 to 16, the seventh inclined surface 53 and the eighth inclined surface 55 may be illustrated in a state of being inclined so as to be directed from upper right to lower left in a cross section that passes through a center of the corner cutting edge 47 and is orthogonal to the corner cutting edge 47 in the front view of the first lateral surface 15.

In cases where a surface region formed by the seventh inclined surface 53 and the eighth inclined surface 55 is inclined so as to become closer to the second reference plane S2 as going away from the corner cutting edge 47 as described above, chips generated by the corner cutting edge 47 can be stably controlled on the surface region.

Figure 14:
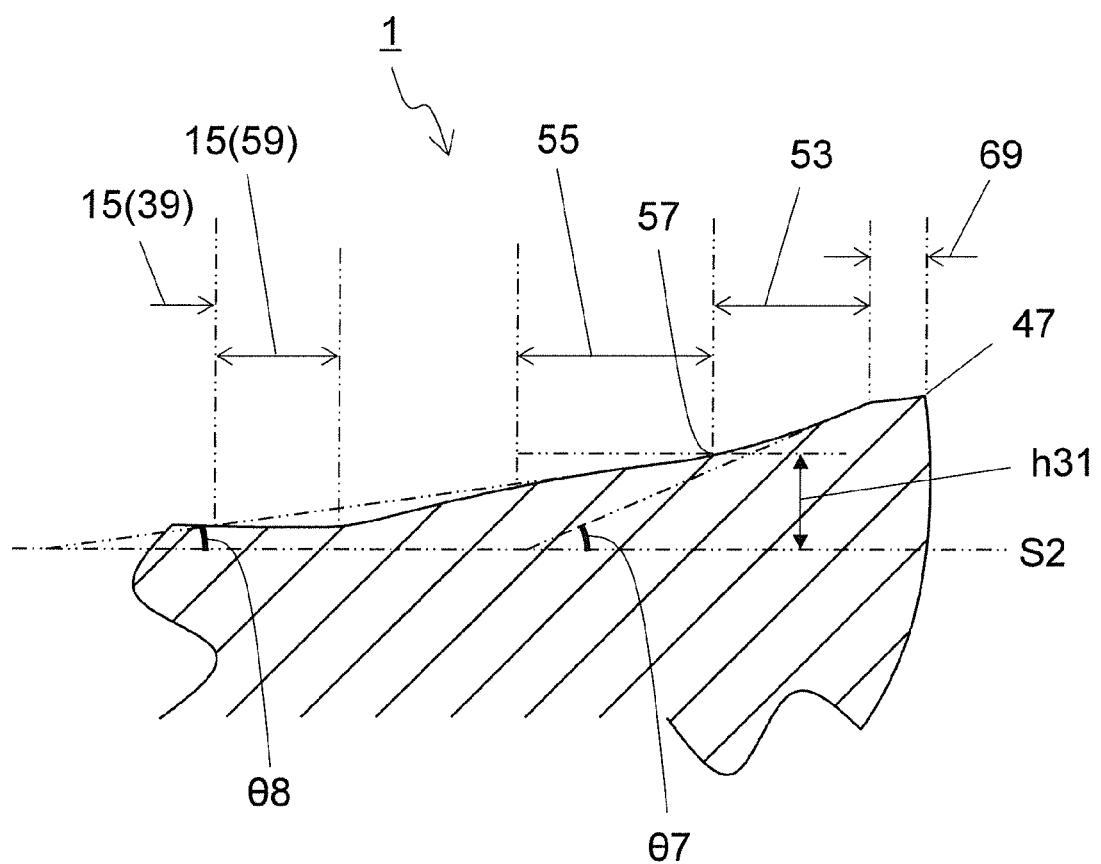
FIG. 14 is a cross-sectional view taken along the line XIV-XIV in the cutting insert illustrated in FIG. 8.
Figure 15:
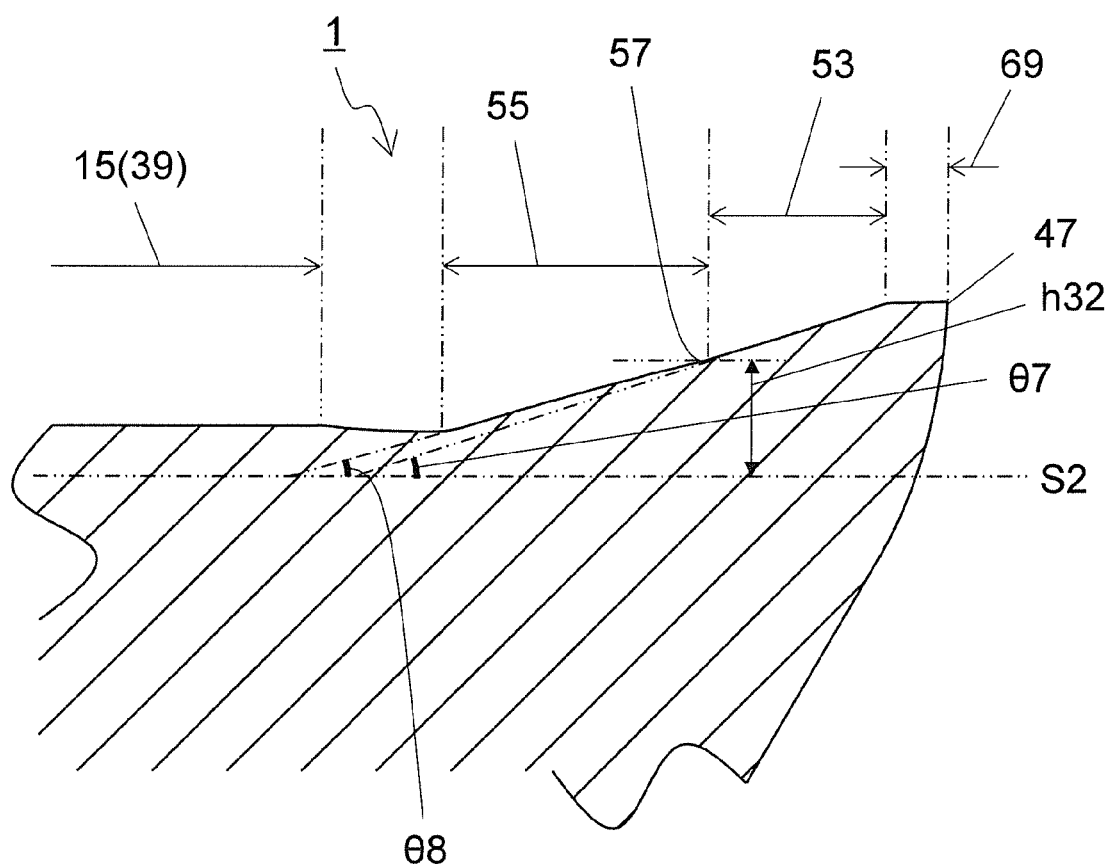
FIG. 15 is a cross-sectional view taken along the line XV-XV in the cutting insert illustrated in FIG. 8.
Figure 16:
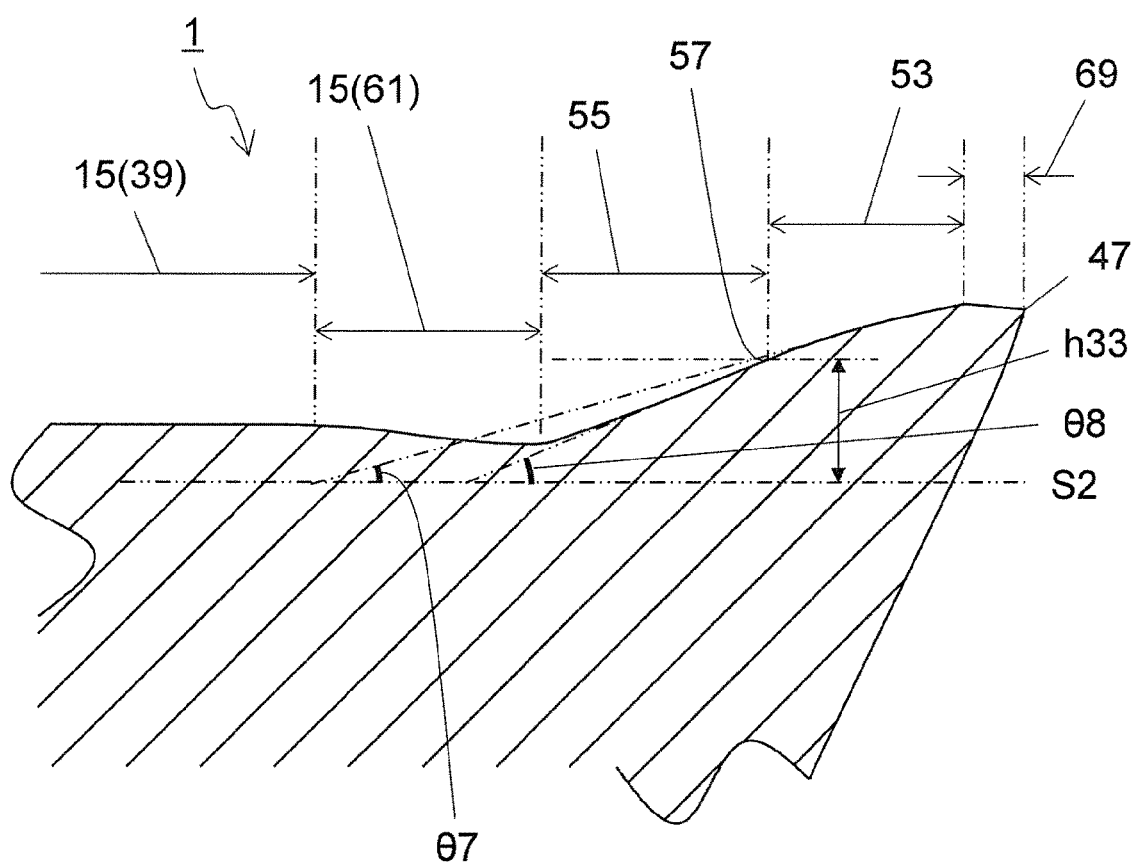
FIG. 16 is a cross-sectional view taken along the line XVI-XVI in the cutting insert illustrated in FIG. 8.

As illustrated in FIGS. 14 and 15, the first lateral surface 15 may include a part thereof in which an eight inclination angle θ8 of the eighth inclined surface 55 relative to the reference plane is smaller than a seventh inclination angle θ7 of the seventh inclined surface 53 relative to the reference plane. As illustrated in FIG. 16, the first lateral surface 15 may include a part thereof in which the eight inclination angle θ8 of the eighth inclined surface 55 relative to the reference plane is larger than the seventh inclination angle θ7 of the seventh inclined surface 53 relative to the reference plane.

Figure 8:
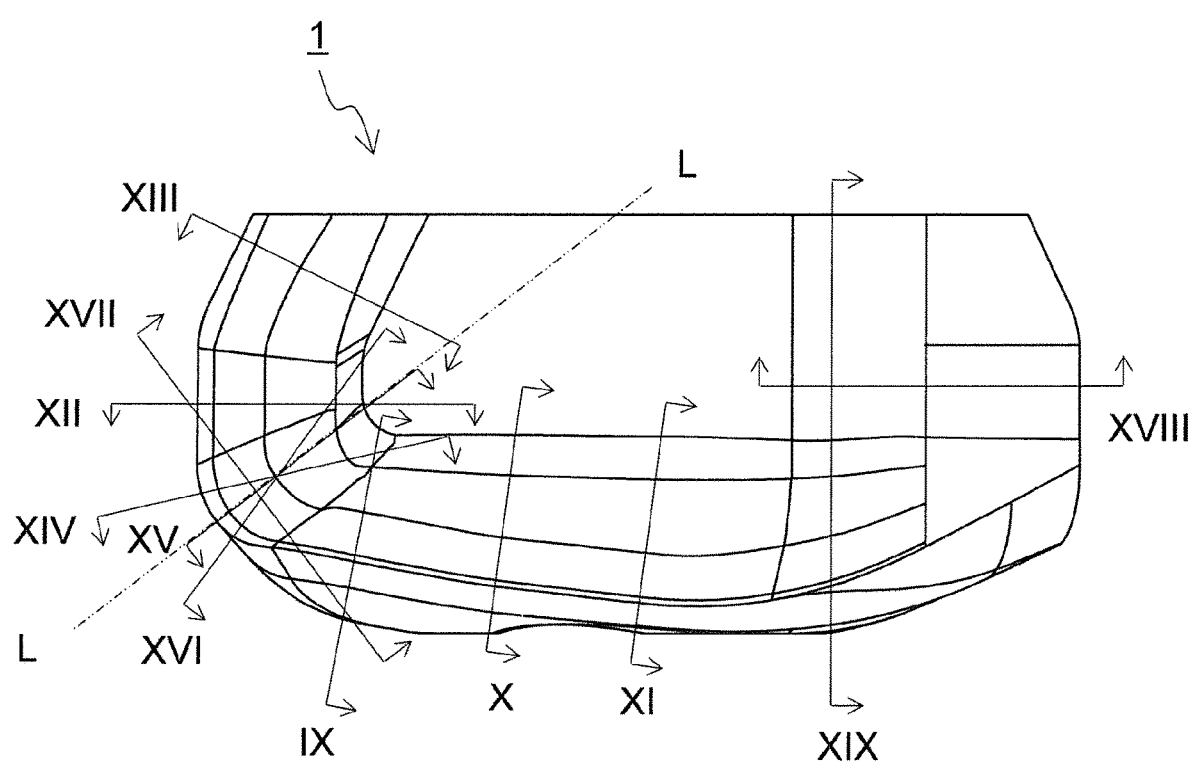
FIG. 8 is a side view identical to the cutting insert illustrated in FIG. 4.

FIG. 14 may be a cross section taken along the line XIV-XIV in the cutting insert 1 illustrated in FIG. 8. FIG. 15 may be a cross section which is taken along the line XV-XV in the cutting insert 1 illustrated in FIG. 8, and which is orthogonal to the corner cutting edge 47 at the center of the corner cutting edge 47 in the front view of the first lateral surface 15. FIG. 16 may be a cross section taken along the line XVI-XVI in the cutting insert 1 illustrated in FIG. 8.

In cases where the eighth inclination angle θ8 is smaller than the seventh inclination angle θ7 as illustrated in FIGS. 14 and 15, a surface region formed by the seventh inclined surface and the eighth inclined surface 55 may have a concavely curved shape. Consequently, chips generated by the corner cutting edge 47 can be stably curled on the surface region formed by the seventh inclined surface 53 and the eighth inclined surface 55.

As stated earlier, the first lateral surface 15 may include the seventh inclined surface 53 and the eighth inclined surface in the non-limiting embodiment illustrated in FIG. 7. The eighth inclined surface 55 may be located away from the seventh inclined surface 53. Alternatively, the eighth inclined surface 55 may be adjacent to the seventh inclined surface 53 as in the non-limiting embodiment illustrated in FIG. 7. A ridgeline may be located at a part where the seventh inclined surface 53 intersects with the eighth inclined surface 55 in the non-limiting embodiment illustrated in FIG. 7. The ridgeline located at the boundary part between the seventh inclined surface 53 and the eighth inclined surface 55 may be denoted by a third boundary line 57.

The third boundary line 57 may include a part thereof located further away from the second reference plane S2 as going away from the first ridgeline 27 and becoming closer to the second ridgeline 29 as in the non-limiting embodiment illustrated in FIGS. 14 to 16. For example, a height of the third boundary line 57 in the non-limiting embodiment illustrated in FIG. 14 from the second reference plane S2 may be denoted by h31. A height of the third boundary line 57 in the non-limiting embodiment illustrated in FIG. 15 from the second reference plane S2 may be denoted by h32. A height of the third boundary line 57 in the non-limiting embodiment illustrated in FIG. 16 from the second reference plane S2 may be denoted by h33. These may have a relationship of h31<h32<h33 as in the non-limiting embodiment illustrated in FIGS. 14 to 16.

With the third boundary line 57 having the above configuration, if chips generated by the corner cutting edge 47 flow from the seventh inclined surface 53 to the eighth inclined surface 55, the chips may tend to flow in a direction away from the second ridgeline 29. Hence, chip clogging may be less likely to occur due to collision between the chips generated by the first cutting edge 23 and the chips generated by second cutting edge 25. This may lead to efficient chip disposal. In particular, if the entirety of the third boundary line 57 is located further away from the second reference plane S2 as going away from the first ridgeline 27 and becoming closer to the second ridgeline 29, more efficient chip disposal may be achievable.

Figure 17:
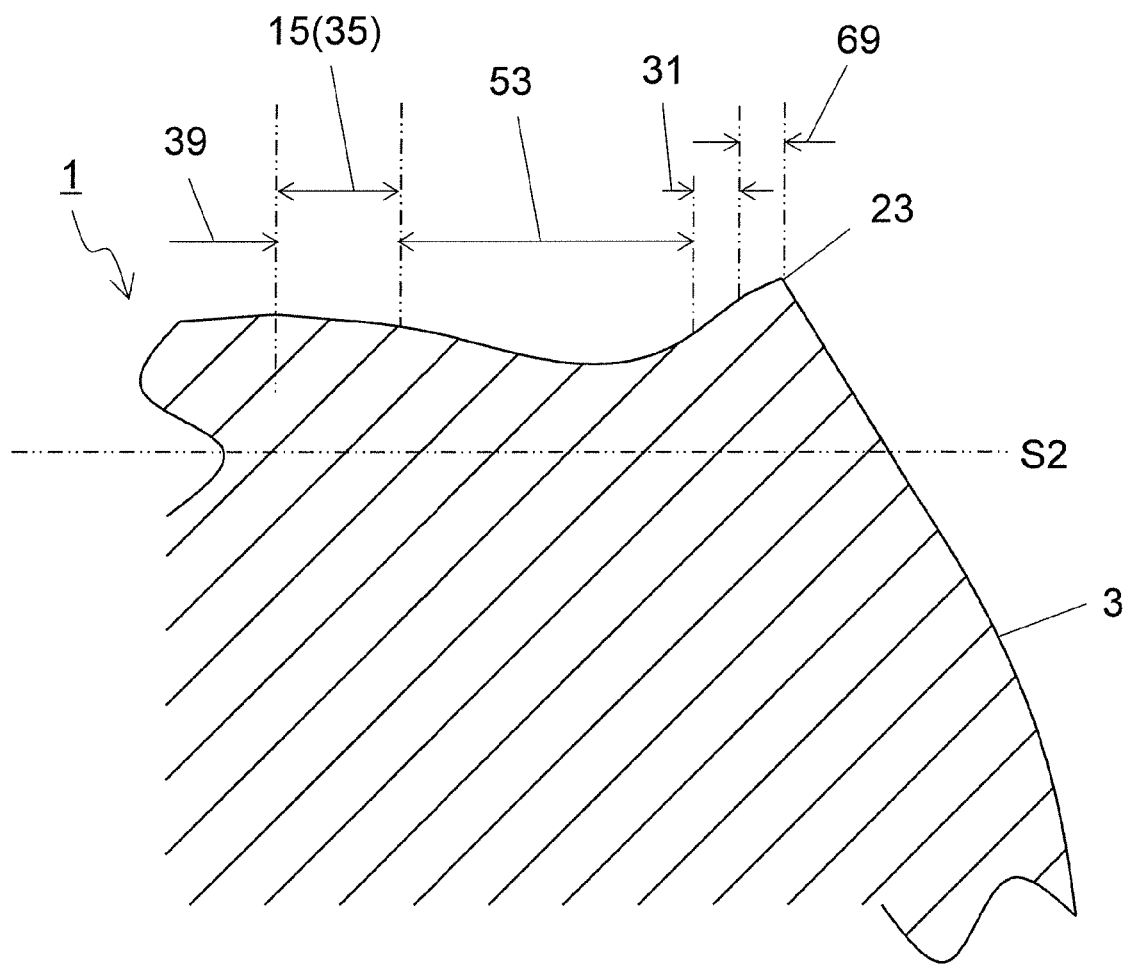
FIG. 17 is a cross-sectional view taken along the line XVII-XVII in the cutting insert illustrated in FIG. 8.

In cases where the insert 1 includes the corner cutting edge 47, an imaginary line that passes through the center of the corner cutting edge 47 and is orthogonal to the corner cutting edge 47 in the front view of the first lateral surface 15 may be referred to as a corner bisector L. The seventh inclined surface 53 may have a concave curvilinear shape in a cross section that is orthogonal to the corner bisector L and intersects with the seventh inclined surface 53 as in the non-limiting embodiment illustrated in FIG. 17.

If the seventh inclined surface 53 has the above configuration, chips generated by the corner cutting edge 47 may tend to flow on the seventh inclined surface 53 accordingly to the shape of the corner cutting edge 47 having a convex curvilinear shape protruded outward. In other words, excessive braking may be less likely to be applied to the chips generated by the corner cutting edge 47 on the seventh inclined surface 53.

A smooth flow of the chips generated by the corner cutting edge 47 may reduce chip clogging in a situation where the chips generated by the corner cutting edge 47 become an obstacle that causes collision between the chips that are generated by the first cutting edge 23 and then flow on the first inclined surface 31 and the chips that are generated by the second cutting edge 25 and then flow on the third inclined surface 35. This may lead to efficient chip disposal.

The first lateral surface 15 may further include a ninth incline surface 59 and a tenth inclined surface 61 as in the non-limiting embodiment illustrated in FIG. 7. The ninth inclined surface 59 may be a surface region located between the second inclined surface 33 and the flat surface 39. The ninth inclined surface 59 may be located further away from the second reference plane S2 as going away from the second inclined surface 33. In other words, the ninth inclined surface 59 may be located further away from the second reference plane S2 as becoming closer to the flat surface 39. The ninth inclined surface 59 may connect to each of the second inclined surface 33 and the flat surface 39 as in the non-limiting embodiment illustrated in FIG. 7.

The tenth inclined surface 61 may be a surface region located between the fourth inclined surface 37 and the flat surface 39. The tenth inclined surface 61 may be located further away from the second reference plane S2 as going away from the fourth inclined surface 37. In other words, the tenth inclined surface 61 may be located further away from the second reference plane S2 as becoming closer to the flat surface 39. The tenth inclined surface 61 may connect to each of the fourth inclined surface 37 and the flat surface 39 as in the non-limiting embodiment illustrated in FIG. 7.

FIGS. 9 to 11 may illustrate a ninth inclination angle θ9 of the ninth inclined surface 59 relative to the second reference plane S2 in a cross section orthogonal to the first cutting edge 23 in the front view of the first lateral surface 15. FIG. 12 may illustrate a tenth inclination angle θ10 of the tenth inclined surface 61 relative to the second reference plane S2 in a cross section orthogonal to the second cutting edge 25 in the front view of the first lateral surface 15. The tenth inclination angle θ10 may be smaller than the ninth inclination angle θ9.

If the tenth inclination angle θ10 is smaller than the ninth inclination angle θ9 and the ninth inclination angle θ9 is therefore relatively large, chips generated by the first cutting edge 23 can be stably curled on the first inclined surface 31, the second inclined surface 33 and the ninth inclined surface 59. This may lead to efficient chip disposal. If the tenth inclination angle θ10 is relatively large, chips generated by the second cutting edge 25 may be less likely to be accumulated, thus leading to efficient chip disposal.

The first inclined surface 31 and the like may be located between the flat surface 39 and the first ridgeline 27. The third inclined surface 35 and the like may be located between the flat surface 39 and the second ridgeline 29. The flat surface 39 may be therefore located away from the first ridgeline 27 and the second ridgeline 29.

The flat surface 39 may be located away from the third ridgeline 63 where the first lateral surface 15 intersects with the second surface 5, or alternatively may be in contact with the third ridgeline 63 as in the non-limiting embodiment illustrated in FIG. 6. If the flat surface 39 is in contact with the third ridgeline 63, the flat surface 39 may have a large area. For example, if the flat surface 39 is used as a surface brought into contact with the pocket of the holder when fixing the insert 1 to the holder, the insert 1 may be stably fixable to the holder.

Figure 18:
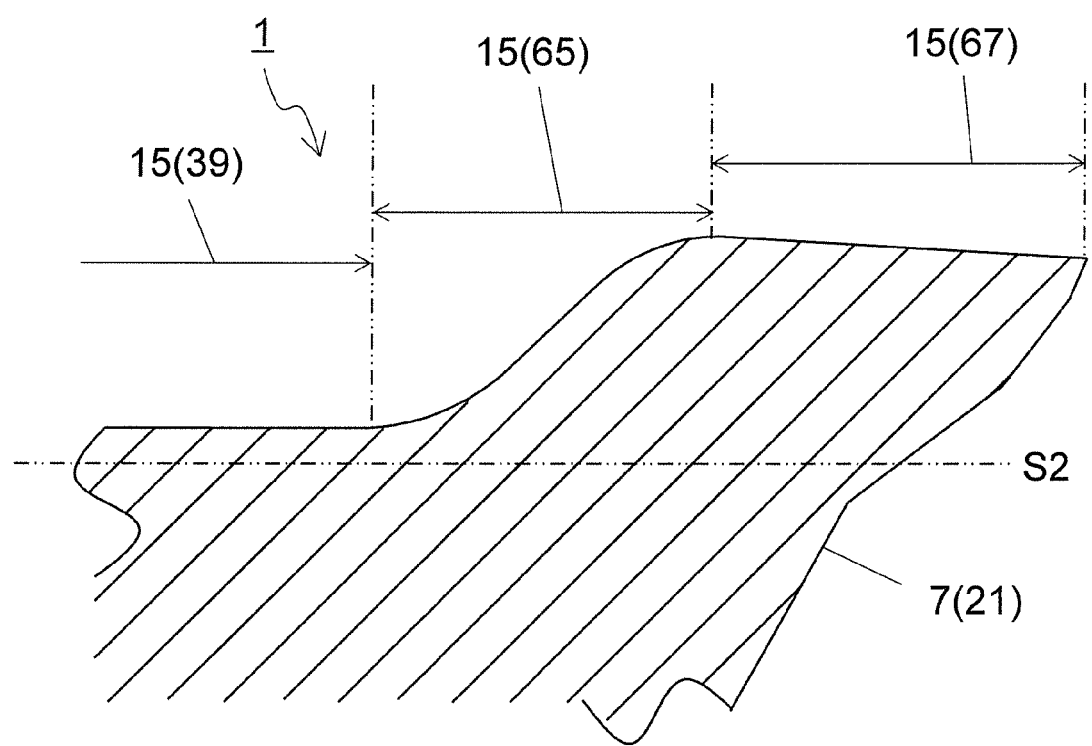
FIG. 18 is a cross-sectional view taken along the line XVIII-XVIII in the cutting insert illustrated in FIG. 8.

The first lateral surface 15 may further include an eleventh inclined surface 65 located further away from the second ridgeline 29 than the flat surface 39 as in the non-limiting embodiment illustrated in FIG. 6. The eleventh inclined surface 65 in the non-limiting embodiment illustrated in FIG. 18 may be located further away from the second reference plane S2 as going away from the flat surface 39.

If the first lateral surface 15 includes the eleventh inclined surface 65 having the above configuration, a flow direction of chips generated by the first cutting edge 23 can be controlled on the eleventh inclined surface 65. The chips generated by the first cutting edge 23 may be curled spirally on the eleventh inclined surface 65. The eleventh inclined surface 65 may be located further away from the corner cutting edge 47 than the flat surface 39. Therefore, even if the chips generated by the first cutting edge 23 are curled on the eleventh inclined surface 65, chips generated by the corner cutting edge 47 may be less likely to be accumulated in the vicinity of the corner cutting edge 47. This may lead to efficient chip disposal.

In cases where the first lateral surface 15 includes the eleventh inclined surface 65, at least a part of the eleventh inclined surface 65 may be located further away from the second reference plane S2 than a part of the first cutting edge 23 and a part of the second cutting edge 25 which are most away from the reference plane S2. For example, at least a part of the eleventh inclined surface 65 may be located above an upper end of each of the first cutting edge 23 and the second cutting edge 25 in FIG. 3. If the eleventh inclined surface 65 has the above configuration, a flow direction of chips generated by the first cutting edge 23 and the second cutting edge 25 can be controlled on the eleventh inclined surface 65.

Figure 19:
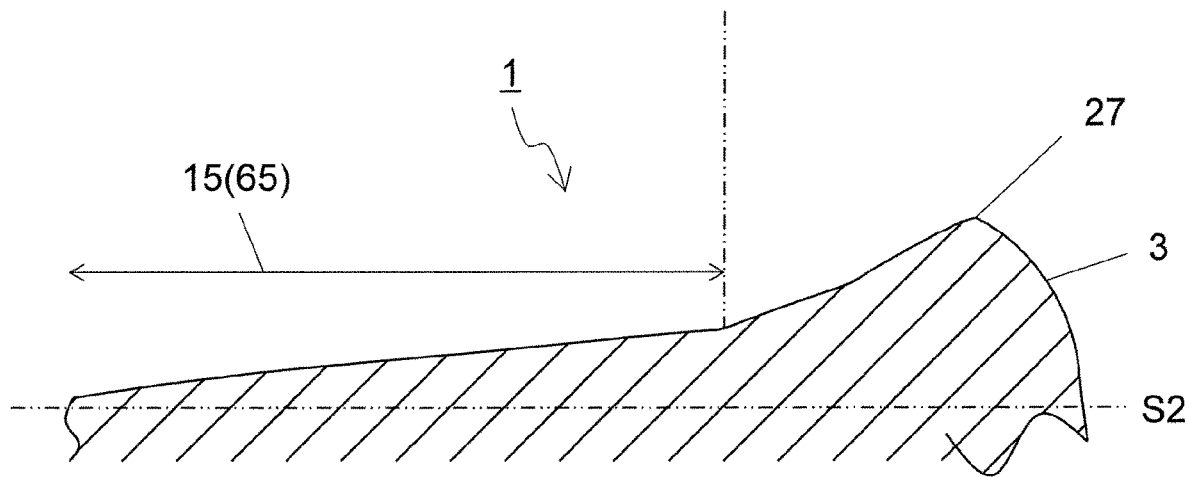
FIG. 19 is a cross-sectional view taken along the line XIX-XIX in the cutting insert illustrated in FIG. 8.

The eleventh inclined surface 65 may be located closer to the second reference plane S2 as going away from the first ridgeline 27 as in the non-limiting embodiment illustrated in FIG. 19. If the eleventh inclined surface 65 has the above configuration, even if chips generated by the first cutting edge come into contact with the eleventh inclined surface 65, a flow direction of the chips may be less likely to reversed and directed to the first cutting edge 23. The chips generated by the first cutting edge 23 may therefore be less likely to be accumulated, thus leading to efficient chip disposal.

The first lateral surface 15 may further include a twelfth inclined surface 67 located further away from the second ridgeline 29 than the eleventh inclined surface 65 as in the non-limiting embodiment illustrated in FIG. 7. The twelfth inclined surface 67 in the non-limiting embodiment illustrated in FIG. 18 may be located closer to the second reference plane S2 as going away from the eleventh inclined surface 65.

If the first lateral surface 15 includes the eleventh inclined surface 65 and the twelfth inclined surface 67 each having the above configuration, the insert 1 may have enhanced durability. For example, in cases where a portion of a cutting edge corresponding to the second cutting edge 25 is located on a ridgeline where the third lateral surface 21 intersects with the first lateral surface 15, it may be easy to ensure the thickness of the insert 1 in the vicinity of the above portion of the cutting edge.

The first lateral surface 15 may include a portion other than the regions described above. For example, the first lateral surface 15 may further include a land surface 69 as illustrated in FIG. 6. The land surface 69 may be located, for example, between the first cutting edge 23 and the first inclined surface 31, between the second cutting edge 25 and the third inclined surface 35, and between the corner cutting edge 47 and the seventh inclined surface 53. The land surface 69 may have a smaller width than the first inclined surface 31, the third inclined surface 35 and the seventh inclined surface 53. If the first lateral surface 15 includes the land surface 69, the cutting edge may have enhanced strength. The insert 1 may therefore have enhanced durability.

<Cutting Tools>

Figure 20:
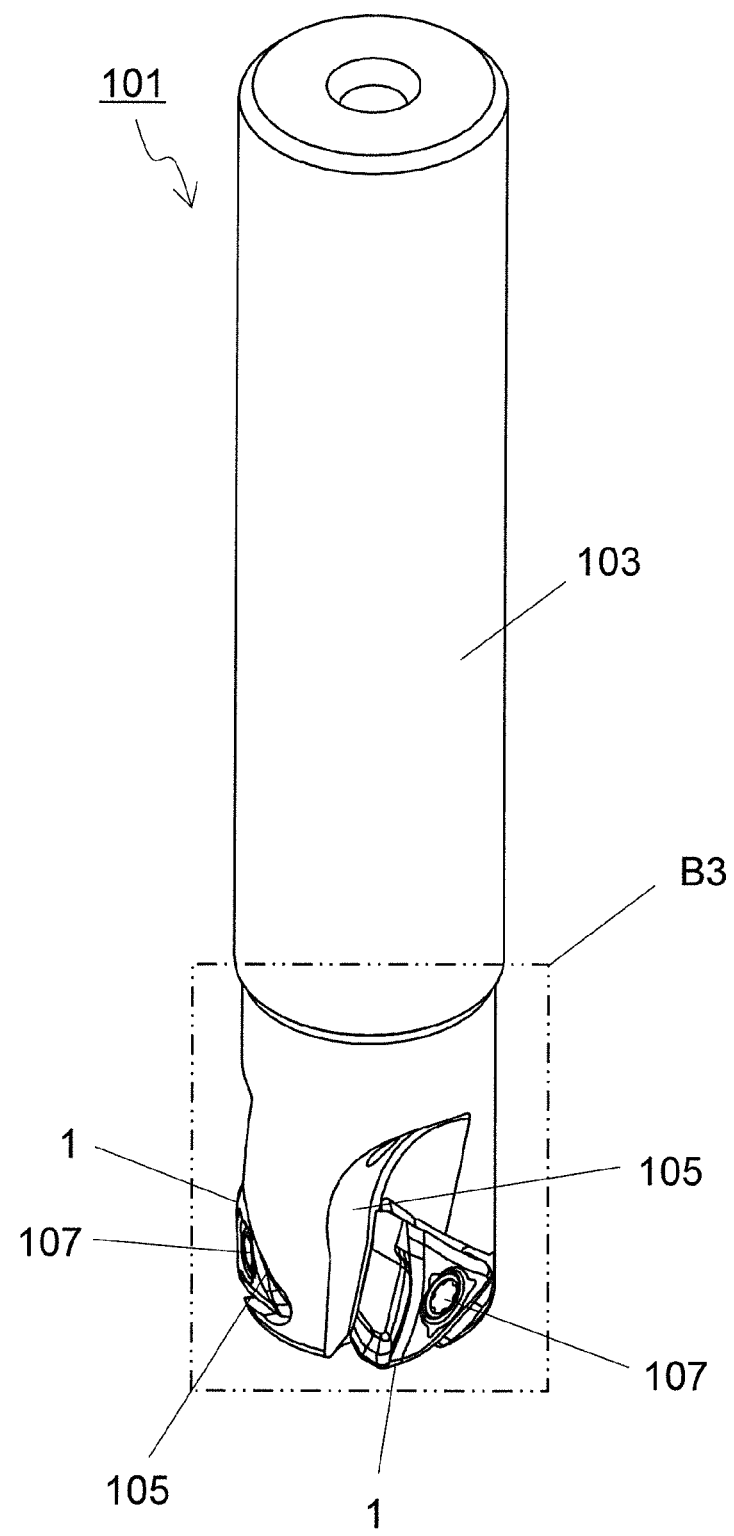
FIG. 20 is a perspective view illustrating a cutting tool in non-limiting aspects of the present disclosure.
Figure 21:
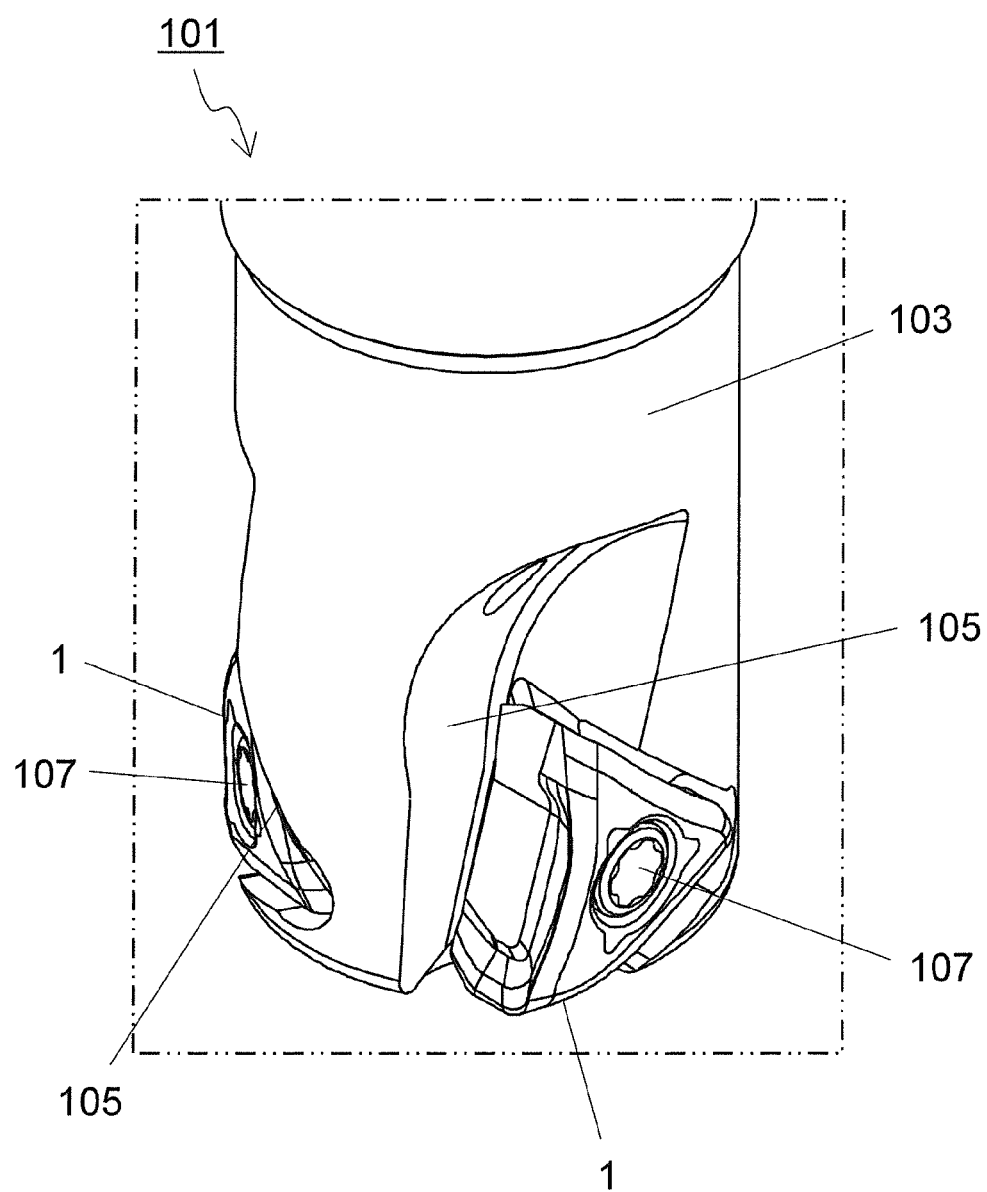
FIG. 21 is an enlarged view of a region B3 illustrated in FIG. 20.

A cutting tool 101 in non-limiting aspects of the present disclosure may be described below with reference to FIGS. 20 and 21. FIGS. 20 and 21 may illustrate a state where the insert 1 illustrated in FIG. 1 is attached to a pocket 105 of a holder 103 by a screw 107. A rotation axis Y1 of the cutting tool 101 may be indicated by a two-dot chain line in FIG. 20 or the like.

The cutting tool 101 in non-limiting embodiments of the present disclosure may be usable for a milling process. The cutting tool 101 may include the holder 103 and the insert 1 as illustrated in FIG. 20. The holder 103 may have a columnar shape extended from a first end to a second end along a rotation axis Y1. The holder 103 may include a pocket 105 located on a side of the first end. The insert 1 may be located in the pocket 105.

The holder 103 may include only one pocket 105, or alternatively, a plurality of pockets 105 as in the non-limiting embodiment illustrated in FIG. 20. If the holder 103 includes the pockets 105, the cutting tool 101 may include the inserts 1, and the inserts 1 may be respectively located in the pockets 105.

The pocket 105 may open into an outer peripheral surface of the holder 103 and an end surface on a side of the first end. In cases where the holder 103 includes the pockets 105, these pockets 105 may be located at equal intervals or unequal intervals around the rotation axis Y1. As apparent from, for example, the fact that the holder 103 includes the pockets 105, the holder 103 may not be a strict columnar shape.

The insert 1 may be attached to the pocket 105 so that at least a part of the cutting edge is protruded from the holder 103. Specifically, the insert 1 of the non-limiting aspects of the present disclosure may be attached to the holder 103 so that the first cutting edge is located more outward than the outer peripheral surface in the holder and the second cutting edge is protruded from the holder toward a workpiece.

At least the second surface, the flat surface on the second lateral surface and the flat surface on the third lateral surface in the insert 1 may be in contact with the holder 103 in the cutting tool 101 in the non-limiting aspects of the present disclosure.

The insert 1 may be attached to the pocket 105 by a screw 107 in the non-limiting aspects of the present disclosure. Specifically, the insert 1 may be attachable to the holder 103 by inserting the screw 107 into a screw hole of the insert 1 and by inserting a front end of the screw 107 into a screw hole (not illustrated) formed in the pocket 105 so as to fix the screw 107 to the screw hole. For example, steel or cast iron may be usable for the holder 103. Of these materials, the use of steel may contribute to enhancing toughness of the holder 103.

<Method for Manufacturing Machined Product>

Figure 22:
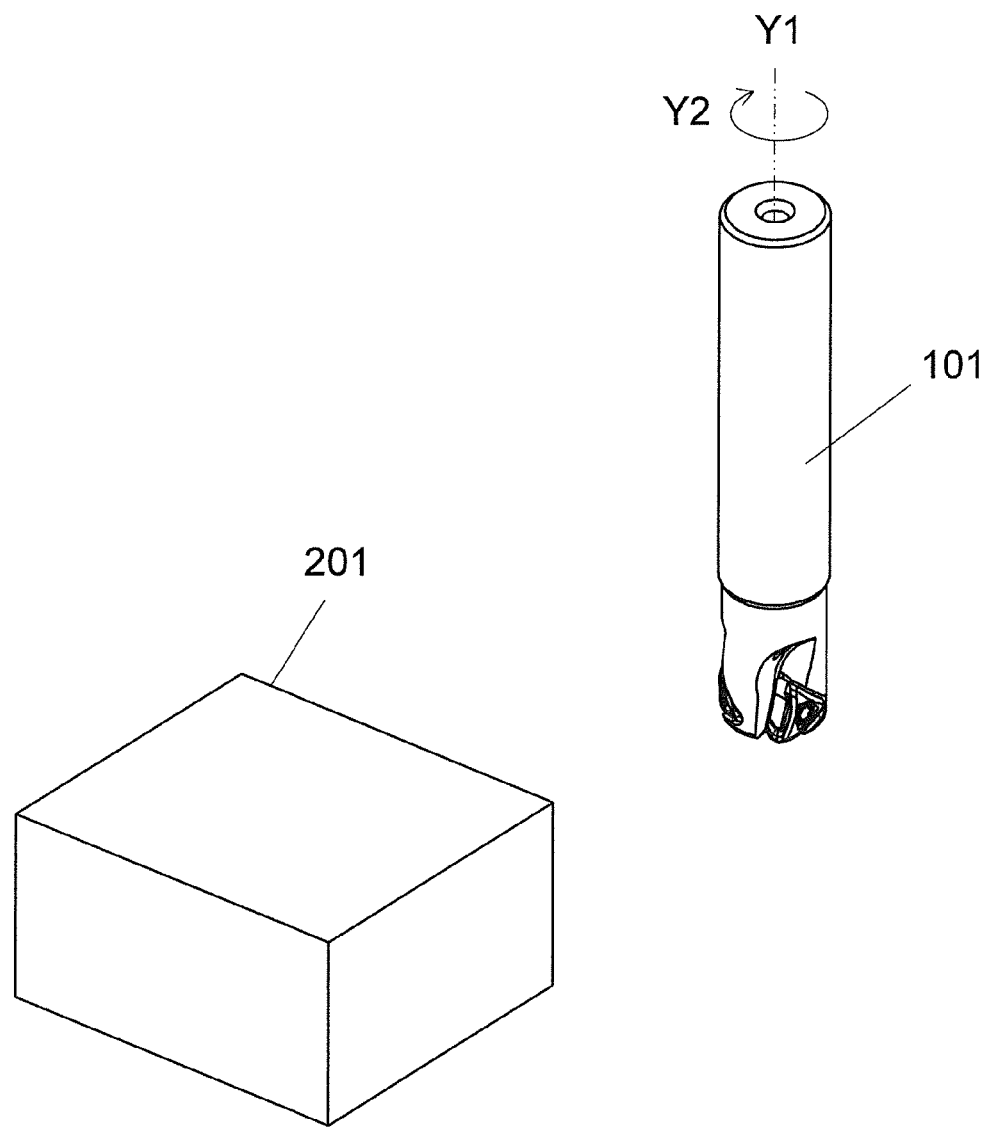
FIG. 22 is a schematic diagram illustrating one of steps in a method for manufacturing a machined product in the non-limiting aspects of the present disclosure.
Figure 23:
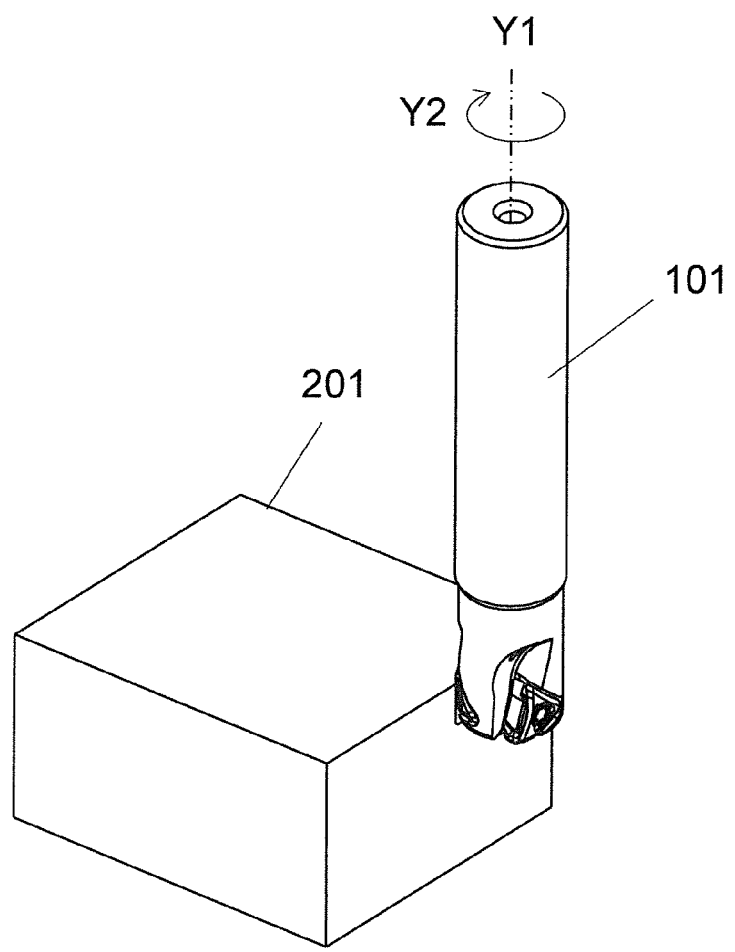
FIG. 23 is a schematic diagram illustrating one of the steps in the method for manufacturing a machined product in the non-limiting aspects of the present disclosure.
Figure 24:
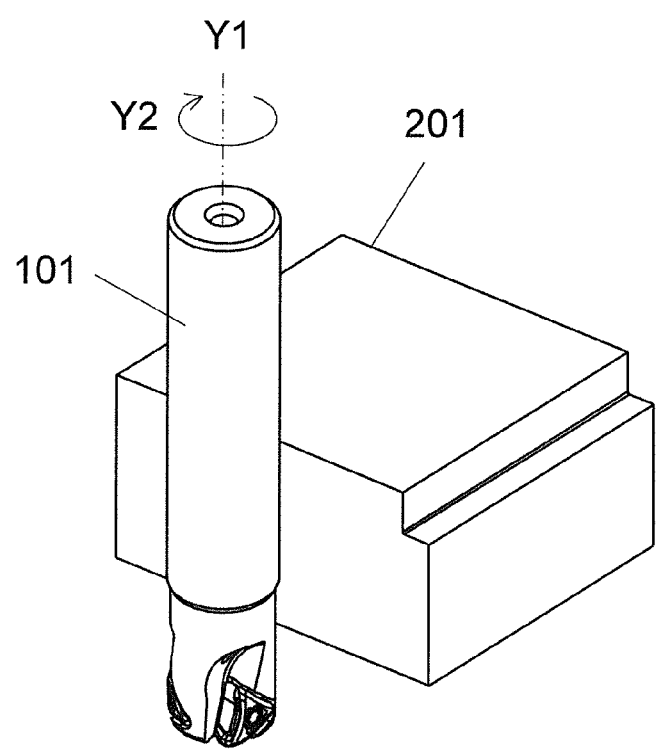
FIG. 24 is a schematic diagram illustrating one of the steps in the method for manufacturing a machined product in the non-limiting aspects of the present disclosure.

A method for manufacturing a machined product in non-limiting aspects of the present disclosure may be described below with reference to FIGS. 22 to 24. FIGS. 22 to 24 may illustrate a method for manufacturing a machined product in a cutting process using the above cutting tool. The rotation axis Y1 of the cutting tool 101 may be indicated by a two-dot chain line in FIGS. 22 to 24. The machined product 203 may be manufacturable by carrying out the cutting process of the workpiece 201. The manufacturing method in the non-limiting aspects of the present disclosure may include the following steps:

(1) rotating the cutting tool 101 represented by the foregoing embodiment;

(2) bringing the cutting tool 101 being rotated into contact with the workpiece 201; and (3) moving the cutting tool 101 away from the workpiece 201.

More specifically, firstly, the cutting tool 101 may be relatively brought near the workpiece 201 while rotating the cutting tool 101 in Y2 direction around the rotation axis Y1. The workpiece 201 may be then cut out by bringing the cutting edge in the cutting tool 101 into contact with the workpiece 201 as illustrated in FIG. 23. Thereafter, the cutting tool 101 may be relatively moved away from the workpiece 201 as illustrated in FIG. 24.

In the non-limiting aspects of the present disclosure, the workpiece 201 may be fixed and the cutting tool 101 may be brought near the workpiece 201. The workpiece 201 may be fixed and the cutting tool 101 may be rotated around the rotation axis Y1 in FIGS. 22 to 24. The workpiece 201 may be fixed and the cutting tool 101 may be moved away in FIG. 24. During the cutting process with the manufacturing method in the non-limiting aspects of the present disclosure, the workpiece 201 may be fixed and the cutting tool 101 may be moved in each of the steps. However, it is not intended to limit to this embodiment.

For example, the workpiece 201 may be brought near the cutting tool 101 in the step (1). Similarly, the workpiece 201 may be moved away from the cutting tool 101 in the step (3). If desired to continue the cutting process, the step of bringing the cutting edge in the insert into contact with different portions of the workpiece 201 may be repeated while keeping the cutting tool 101 rotated.

Representative examples of material of the workpiece 201 may include carbon steel, alloy steel, stainless steel, cast iron and nonferrous metals.

DESCRIPTION OF THE REFERENCE NUMERAL 1 cutting insert (insert)
3 first surface
5 second surface
5a surface region
7 lateral surface
9 through hole
11 first side
13 second side
15 first lateral surface
17 second lateral surface
19 third side
21 third lateral surface
23 first cutting edge
23a first straight line part
25 second cutting edge
25a second straight line part
27 first ridgeline
29 second ridgeline
31 first inclined surface
33 second inclined surface
35 third inclined surface
37 fourth inclined surface
39 flat surface
41 third cutting edge
43 fifth inclined surface
45 sixth inclined surface
47 corner cutting edge
49 first boundary line
51 second boundary line
53 seventh inclined surface
55 eighth inclined surface
57 third boundary line
59 ninth inclined surface
61 tenth inclined surface
63 third ridgeline
65 eleventh inclined surface
67 twelfth inclined surface
69 land surface
101 cutting tool
103 holder
105 pocket
107 screw
201 workpiece
203 machined product

The invention claimed is:

1. A cutting insert, comprising:
a first surface having a polygonal shape and comprising a first corner, and a first side and a second side each being extended from the first corner;

a second surface having a polygonal shape located on a side opposite to the first surface;
a lateral surface which is located between the first surface and the second surface, and which comprises a first lateral surface located along the first side and a second lateral surface located along the second side;
a first cutting edge located on a first ridgeline where the first surface intersects with the first lateral surface; and
a second cutting edge located on a second ridgeline where the first lateral surface intersects with the second lateral surface, wherein
the first lateral surface comprises
   a first inclined surface located along the first ridgeline,
   a second inclined surface located along the first inclined surface,
   a third inclined surface located along the second ridgeline,
   a fourth inclined surface located along the third inclined surface, and
   a flat surface located along the second inclined surface and the fourth inclined surface,
an imaginary flat surface, which is parallel to the flat surface and located more inside than the first lateral surface, is a reference plane,
each of the first inclined surface and the second inclined surface is closer to the reference plane as going away from the first ridgeline,
each of the third inclined surface and the fourth inclined surface is closer to the reference plane as going away from the second ridgeline,
in a cross section orthogonal to the first ridgeline in a front view of the first lateral surface,
   an inclination angle of the first inclined surface relative to the reference plane is a first inclination angle, and
   an inclination angle of the second inclined surface relative to the reference plane is a second inclination angle,
in a cross section orthogonal to the second ridgeline in a front view of the first lateral surface,
   an inclination angle of the third inclined surface relative to the reference plane is a third inclination angle, and
   an inclination angle of the fourth inclined surface relative to the reference plane is a fourth inclination angle,
the second inclination angle is smaller than the first inclination angle, and
the fourth inclination angle is larger than the third inclination angle.

2. The cutting insert according to claim 1, wherein
the first cutting edge is located along the first inclined surface, and comprises a part which is further away from the reference plane as going away from the second ridgeline, and
the second cutting edge is located along the third inclined surface, and comprises a part whose height from the reference plane is constant.

3. The cutting insert according to claim 1, further comprising
a corner cutting edge having a convex curvilinear shape protruded outward and connecting to each of the first ridgeline and the second ridgeline, wherein
in a front view of the first lateral surface,
   the first cutting edge comprises a first straight line part having a straight line shape connecting to the corner cutting edge,
   the second cutting edge comprises a second straight line part having a straight line shape connecting to the corner cutting edge, and
   an angle formed by an extension line of the first straight line part and an extension line of the second straight line part is an obtuse angle.

4. The cutting insert according to claim 3, wherein
a first boundary line
   is located on an intersection of the first inclined surface and the second inclined surface, and
   comprises a part which is further away from the reference plane as going away from the second ridgeline.

5. The cutting insert according to claim 1, wherein
the second cutting edge comprises a part which is located along the third inclined surface,
the cutting insert further comprises a third cutting edge located on the second ridgeline,
the third cutting edge is located further away from the first ridgeline than the second cutting edge, and
the third cutting edge is inclined relative to the second cutting edge in a front view of the first lateral surface.

6. The cutting insert according to claim 5, wherein the third cutting edge is closer to the reference plane as going away from the second cutting edge.

7. The cutting insert according to claim 5, wherein
the third inclined surface is located along the second cutting edge on the second ridgeline,
the first lateral surface further comprises
   a fifth inclined surface located along the third cutting edge on the second ridgeline, and
   a sixth inclined surface located along the fifth inclined surface,
the fifth inclined surface is further away from the reference plane as going away from the second ridgeline, and
the sixth inclined surface is closer to the reference plane as going away from the fifth inclined surface.

8. The cutting insert according to claim 7, wherein
in a cross section orthogonal to the third cutting edge in the front view of the first lateral surface,
   an inclination angle of the fifth inclined surface relative to the reference plane is a fifth inclination angle, and
   an inclination angle of the sixth inclined surface relative to the reference plane is a sixth inclination angle, and
the sixth inclination angle is larger than the fifth inclination angle.

9. The cutting insert according to claim 1, further comprising
a corner cutting edge having a convex curvilinear shape protruded outward and connecting to each of the first ridgeline and the second ridgeline, wherein
the first lateral surface further comprises
   a seventh inclined surface located along the corner cutting edge, and
   an eighth inclined surface located along the seventh inclined surface,
in a cross section that passes through a center of the corner cutting edge and is orthogonal to the corner cutting edge in the front view of the first lateral surface,
   an inclination angle of the seventh inclined surface relative to the reference plane is a seventh inclination angle, and
   an inclination angle of the eighth inclined surface relative to the reference plane is a eighth inclination angle, and the eighth inclination angle is smaller than the seventh inclination angle.

10. The cutting insert according to claim 9, wherein
a third boundary line
is located on an intersection of the seventh inclined surface and the eighth inclined surface, and
comprises a part which is further away from the reference plane as going away from the first ridgeline.

11. The cutting insert according to claim 1, wherein the first lateral surface further comprises
a ninth inclined surface located between the second inclined surface and the flat surface and located further away from the reference plane as going away from the second inclined surface, and
a tenth inclined surface located between the fourth inclined surface and the flat surface and located further away from the reference plane as going away from the fourth inclined surface,
an inclination angle of the ninth inclined surface relative to the reference plane is a ninth inclination angle in a cross section orthogonal to the first ridgeline in the front view of the first lateral surface,
an inclination angle of the tenth inclined surface relative to the reference plane is a tenth inclination angle in a cross section orthogonal to the second ridgeline in the front view of the first lateral surface, and
the tenth inclination angle is smaller than the ninth inclination angle.

12. The cutting insert according to claim 1, wherein the flat surface is in contact with a third ridgeline located on an intersection of the first lateral surface and the second surface.

13. The cutting insert according to claim 1, wherein
the first lateral surface further comprises an eleventh inclined surface located further away from the second ridgeline than the flat surface and located further away from the reference plane as going away from the flat surface, and
at least a part of the eleventh inclined surface is located further away from the reference plane than each of the first cutting edge and the second cutting edge.

14. The cutting insert according to claim 13, wherein the eleventh inclined surface is closer to the reference plane as going away from the first ridgeline.

15. The cutting insert according to claim 13, wherein the first lateral surface further comprises a twelfth inclined surface located further away from the second ridgeline than the eleventh inclined surface and located closer to the reference plane as going away from the eleventh inclined surface.

16. A cutting tool, comprising:
a holder which has a columnar shape extended from a first end to a second end along a rotation axis and comprises a pocket located on a side of the first end; and
the cutting insert according to claim 1, the cutting insert being located in the pocket.

17. A method for manufacturing a machined product, comprising:
rotating the cutting tool according to claim 16;
bringing the cutting tool being rotated into contact with a workpiece; and
moving the cutting tool away from the workpiece.

* * * * *